United States Patent [19]
Misra et al.

[11] Patent Number: 5,505,857
[45] Date of Patent: Apr. 9, 1996

[54] PROCESS FOR THE TREATMENT OF METAL-CONTAINING WATER AND RECOVERY OF METALS THEREFROM

[75] Inventors: Manoranjan Misra, Reno, Nev.; Mark E. Kravetz, Cote Madera, Calif.; Kang Yang, Reno, Nev.; Thomas E. McNeel, Memphis, Tenn.

[73] Assignees: Buckman Laboratories International, Inc., Memphis, Tenn.; Board of Regents of the University and Community College System of Nevada on behalf of the University of Nevada, Reno, Nev.

[21] Appl. No.: 181,119

[22] Filed: Jan. 13, 1994

[51] Int. Cl.$^6$ ............................................. C02F 1/62
[52] U.S. Cl. ..................... 210/709; 210/719; 210/722; 210/724; 210/725; 210/726; 210/727; 210/912; 423/34; 423/122; 423/140; 423/594
[58] Field of Search ................... 210/719, 720, 210/721, 722, 724, 725, 726–728, 729, 709, 912–914; 423/34, 122, 140, 594

[56] References Cited

U.S. PATENT DOCUMENTS

| | | | |
|---|---|---|---|
| 3,822,210 | 7/1974 | Iwase et al. | 423/594 |
| 3,931,007 | 1/1976 | Sugano et al. | 210/721 |
| 4,678,584 | 7/1987 | Elfline | 210/720 |
| 4,789,446 | 12/1988 | Von Röpenack et al. | 423/122 |
| 4,889,697 | 12/1989 | Fukushima et al. | 423/140 |
| 4,943,377 | 7/1990 | Legare | 210/912 |
| 4,971,775 | 11/1990 | Hoy et al. | 210/719 |
| 5,320,759 | 6/1994 | Coltrinari | 210/722 |

FOREIGN PATENT DOCUMENTS

| | | |
|---|---|---|
| 3841590 | 6/1989 | Germany . |
| 51-140873 | 12/1976 | Japan . |
| 52-152657 | 12/1977 | Japan . |
| 60-019092 | 1/1985 | Japan . |

OTHER PUBLICATIONS

Okuda et al., "Removal of Heavy Metals from Wastewater by Ferrite Co-Precipitation," Filtration & Separation, pp. 472, 475, 476, and 478 Sep./Oct. 1975.
Okuda et al., Removal of Heavy Metals from Waste (List continued on next page.)

*Primary Examiner*—Peter A. Hruskoci
*Attorney, Agent, or Firm*—Finnegan, Henderson, Farabow, Garrett & Dunner

[57] ABSTRACT

Metals contained in various wastewaters are selectively recovered as metal precipitates and/or as spinel ferrite and water suitable for discharge into the environment is obtained. High grade magnetic spinel ferrite is recovered from wastewaters having aluminum and arsenic if present in the wastewater, removed from the wastewater. There are three process stages for the treatment of wastewater. In the first process stage which is optional, at least a portion of at least one non-ferrous or non-ferric metal is precipitated from the wastewater by subjecting the wastewater to an oxidizing agent to increase the oxidation-reduction potential of the water, by adjusting the pH of the wastewater to a pH at which the metal precipitates from the water and by adding an organic or inorganic sulfur compound, capable of causing the metal to form a precipitate, to the water in a quantity sufficient to precipitate the metal. When aluminum is present in the wastewater, aluminum is recovered from the water by adding a reducing agent to lower the oxidation-reduction potential of the water and by adjusting the pH of the water to about 5. The aluminum which precipitates in the aqueous solution, is removed from the water. In the third precipitation stage, iron is recovered as spinel ferrite in an ambient temperature process by adding a reducing agent to the water, adding a soluble ferrous salt to the water, adjusting the pH to about 9–12 and oxidizing the water with an oxidizer, e.g., air, to form spinel ferrite. If aluminum and/or arsenic are present in the wastewater and are removed from the wastewater by the process, high grade magnetic spinel ferrite is recovered.

42 Claims, 11 Drawing Sheets

OTHER PUBLICATIONS

Water by Ferrite Coprecipation, Chemical Abstracts, No. 84:155241n, vol. 84, p. 326 (1976).

Y. Ikeda, Recovery of Heavy Metals in Waste Water by the Ferrite Method, Chemical Abstracts, No. 86:21443n, vol. 86, p. 316 (1977).

T. Nagashima, Removal of Heavy Metals From Waste Water, Chemical Abstracts, No. 87:140832u, vol. 87, p. 297 (1977).

Nippon Electric Co., Ltd., Heavy Metal Removal System by the Ferrite Method, Chemical Abstracts, No. 88:94343f, vol. 88, p. 301 (1978).

Kondo et al., Heavy Metal Removal From Incinerator Ash, Chemical Abstracts, No. 89:64702a, vol. 89, p. 304, (1978).

T. Sugiura, Removal of Heavy Metals from Wastewaters, Chemical Abstracts, No. 89:135248v, vol. 89, p. 359 (1978).

Nojiri et al., Removal of Heavy Metals from Wastewaters by Magnetic Separation, Chemical Abstracts, No. 91:44175u, vol. 91, p. 297 (1979).

Kondo et al., Treatment of Wastewater Containing Heavy Metal Ions, Chemical Abstracts, No. 91:62245w, vol. 91, p. 321 (1979).

Sugano et al., Treatment for Heavy Metal Containing Waste Solution, Chemical Abstracts, No. 91:145665j, vol. 91, p. 308 (1979).

T. Takada, Ferrite Precipitation Technique for Removing Heavy Metals From Waste Waters, Chemical Abstracts, No. 94:52187b, vol. 94, p. 318 (1981).

Nojiri et al., Electrolytic Ferrite Formation System for Heavy Metal Removal, Chemical Abstracts, No. 94:70723c, vol. 94, p. 325 (1981).

Uchino et al., Removal of Heavy Metal Ions from Aqueous Solutions by Ferrite Formation, Chemical Abstracts, No. 94:213919j, vol. 94, p. 339(1981).

Sumitomo Heavy Industries, Ltd., Control of Conversion of Heavy Metal Ions to Ferrites, Chemical Abstracts, No. 96:11259z, vol. 96, p. 305 (1982).

Nippon Electric Co., Ltd., Treatment of Wastewater Containing Heavy Metals, Chemical Abstracts, No. 96:204919y, vol. 96, (1982).

Uchino et al., Ferrites/HGMS Method for Heavy Metals Removed From Wastewaters, Chemical Abstracts, No. 97:60373m, vol. 97 (1982).

Kondo et al., Treatment of Wastewater Containing Heavy Metal Ions by Ferrite Formation, Chemical Abstracts, No. 97:187637f, vol. 97, p. 340, (1982).

Kondo et al., Treatment of Wastewater Containing Heavy Metal Ions by Ferrite Formation, Chemical Abstracts, No. 97:187638q, vol. 97, p. 340,(1982).

Nippon Electric Co., Ltd., Treatment of Wastewater Containing Heavy Metals, Chemical Abstracts, No. 98:77664a, vol. 98, p. 313 (1983).

Nippon Electric Co., Ltd., Precipitation by Ferrite Formation and Magnetic Separation, Chemical Abstracts, No. 98:221343q, vol. 98, p. 346, (1983).

NEC Corp., Wastewater Treatment, Chemical Abstracts, No. 102:190437t, vol. 102, p. 343 (1985).

Sumitomo Heavy Industries, Ltd., Ferrite Reactor for Wastewater Treatment, Chemical Abstracts, No. 102:208826f, vol. 102, p. 317 (1985).

Shin et al., A Study of Ferrite Process for Heavy Metal Removal in Wastewater (part 2)., Chemical Abstracts, No. 110:178897a.

Skousen, "An Evaluation of Acid Mine Drainage Treatment Systems and Costs", Environmental Management of 1990, SME, Colorado, Chapter 24, pp. 173–178, 1991.

Shea-Albin et al., "Mining Waste Research in the U.S. Bureau of Mines", Environmental Management for 1990, Society of Mining and Engineering, Littleton, Colorado, Chapter 24, pp. 199–205, 1991.

Tamura et al., "The $Fe_3O_4$–Formation by the 'Ferrite Process'", Water Research , 13, pp. 21–31, 1979.

Takada, "Development and Application of Synthesizing Technique of Spinel Ferrites by the Wet Method", Ferrites, Proceedings of the International Conference, Sep.–Oct., 1980, Japan, pp. 3–6.

Mehta et al., "Chemoremediation of Acid Mine Drainage by Controlled Ferrite Coprecipitation and Magnetic Separation", Society for Mining, Metallurgy and Exploration, Reprint No. 92–216, pp. 1–7 (1992).

Mehta Water by Ferrite., "removal of Heavy Metal Ions from Oil Shale Beneficiation Process Water by Ferrite Process", 1991 Eastern Oil Shale Symposium, Nov. 13–15, Lexington, Kentucky, pp. 362–366, 1991.

Tsutaoka et al., "Physical and Chemical Properties of Magnetic Fluid Using Ferrite Material From Mine Drainage and Possibility for Some Applications", International Conference on Ferrite pp. 1113–1118, 1989.

Tamaura et al., "Solidification of Heavy Metal Ions Into Stabilized Ferrite Sludge", Ferrite Proceedings of the International Conference, India pp. 1173–1178 (1989).

Jha et al., "Composites Based on Waste–Ferrites as Microwave Absorber", Advance in Ferrite, vol. 2, p. 961–965, 1989.

Stewart et al., "Effects of Pyritic Tailings in an Abandoned Impoundment on Downgradient Groundwater Quality", Mining and Mineral Processing Wates, SME, Chapter 16, pp. 133–135, 1990.

F. Doyle et al., "Understanding the Mechanisms and Kinetics of Acid and Heavy Metals Release from Pyritic Wastes", Mining and Mineral Processing Wastes, 43–51 (1990).

Nordstrom "Aqueous Pyrite Oxidation and the Consequent Formation of Secondary Iron Minerals, Acid Sulfate Weathering, SSSA Specical Publication No. 10, Publication" Soil Science Society of America, 37–56 and 6 pages of photographs (1982).

PROCESS FOR THE TREATMENT OF METAL-CONTAINING WATER AND RECOVERY OF METALS THEREFROM

BACKGROUND OF THE INVENTION

The present invention relates to a process for the treatment of metal-containing water and, more particularly, to a process for the selective removal of metals and the recovery of metals and magnetic spinel ferrite from metal-containing water.

Contaminated waters are generally waters having a high dissolved iron (ferrous and/or ferric) content and other dissolved main group and/or transition metals (non-ferrous and non-ferric), such as, for example, copper, zinc, aluminum, manganese, silver, lead, cadmium, gold, nickel, arsenic and the like, as well as lanthanides and actinides, and include acid rock drainage, acid mine waters, mineral industries wastewaters and other contaminated industrial wastewaters. However, in certain instances waters which are contaminated with metals, have little or no iron, e.g., industrial waters from the electroplating industry. Thus, as used herein, the metals in contaminated waters or wastewaters may contain 0% iron or may have a high iron content and may include one or more of the listed non-ferrous and non-ferric metals as well as other metals not included in the list. The composition of waters contaminated with metals can vary substantially depending on the source or origin of the water.

One of the major problems facing the mining and mineral processing industry is the disposal and management of sulfide containing tailings, defined herein as the spent, crushed rock and waste that remains after harvestable metals, ores, minerals and the like have been removed. Acids, metals, metal oxides, metal salts and the like become available from tailings to contaminate both local surface and ground waters. This damaging runoff is referred to as acid rock drainage or acid mine drainage. In certain instances, tailings containing pyrite, marcasite and pyrrhotite create particular problems because they oxidize readily due to weathering to form contaminated acid mine drainage. The rate of oxidation depends on the sulfide content, morphology, bacterial activity, ferric ion concentration, and oxygen availability. The acid mine drainage contains a high concentration of iron and other dissolved metals and has an excessively acidic pH.

It is estimated that more than 5000 miles of streams and rivers in the United States are contaminated by acid mine drainage. Acid mine drainage also accumulates in pits and excavation sites in large quantities. One such pit is the Berkeley pit in Butte, Mont. which contains about 20 billion gallons of contaminated water and has an additional volume of acid mine water accumulating in the pit at a rate of about 7 million gallons/day. Even though large sums of money are being spent annually to mitigate and/or control the problem of acid mine drainage, the problem still exists and the generation of acid mine water is steadily increasing. In addition, the process waters generated from chemical companies and electroplating industries in many instances contain highly acidic waste solutions similar to acid mine water and require removal of metals and other contaminants. Virtually all heavy metal wastewaters from mine runoff to pickling liquors and rinses, galvanizing wastes, plating wastes and hardening wastes must be treated to remove metals which contaminate the waste before the waste can be discharged into streams and other bodies of water.

Over the years, two principal approaches have been utilized to control or treat acid mine drainage. Preventive control measures (solids) include attempts to remove the sulfides, control the bacterial activity, control oxygen diffusion, coat the sulfide particles and agglomerate the tailings. Treatment techniques (water) include neutralization, precipitation of hydroxides, precipitation with sulfides, adsorption and removal.

In the treatment and recovery of heavy metal ions from acid mine drainage, the conventional approach has been lime neutralization to precipitate the metal hydroxide. The precipitated hydroxides are difficult to filter and do not have any market or saleable value. The metal hydroxides are not chemically stable and they are impounded as "hydroxide sludge" and will have to be decontaminated in the future.

The sulfide precipitation technique which utilizes sulfides as a precipitating agent, produces metal sulfides which are more stable as compared to the hydroxides. The metal sulfides are difficult to filter from solution, however flotation can be used to separate most of the metal sulfides. Furthermore, under certain circumstances, when an excess of sodium sulfide is used as a precipitating agent, a hazardous gas, $H_2S$, is often produced during the precipitation. A closed reactor vessel with secure venting would be required to minimize safety risks. Further, the consumption of sulfides and other sulfur-containing compounds is excessive in the prior art processes due to the oxygen-sensitive nature of sulfide. Metal precipitates involving sulfur-containing organic compounds are easier to filter than inorganic sulfides and have been more widely used for wastewater treatment in recent times. However, when a waste stream contains a very large amount of metal to be treated, it is sometimes not economically feasible to employ these organic precipitates.

Conventional prior art resin adsorption and activated carbon adsorption processes for removal of metal contaminants from wastewaters are not practical and cannot meet the challenge posed by the enormous volume of wastewaters, e.g., acid mine water.

Because of the foregoing disadvantages, it can be seen that the technology discussed above is insufficient to handle the acid mine drainage, mineral industries and other industrial wastewater problems and that there is a need to develop improved processes for treating acid mine drainage, mineral industries and other industrial wastewaters.

Ferrite co-precipitation processes are known in the prior art and are described by Okuda et al. in "Removal of Heavy Metals from Wastewater by Ferrite Co-Precipitation in Filtration & Separation", 1975, pp. 472–478. The co-precipitation process is illustrated by the reaction as shown in the following formulas:

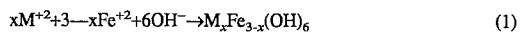

$$xM^{+2}+3-xFe^{+2}+6OH^-\rightarrow M_xFe_{3-x}(OH)_6 \qquad (1)$$

$$M_xFe_{3-x}(OH)_6+O_2\rightarrow M_xFe_{3-x}O_4 \qquad (2)$$

wherein $M^{+2}$ represents non-ferrous divalent metal ions and $Fe^{+2}$ represents divalent iron ions and $OH^-$ is a hydroxide derived from an alkali metal hydroxide. In reaction (1), when divalent iron ions coexist with non-ferrous divalent metal ions, in an aqueous solution, the addition of an equivalent amount of alkali forms a dark green mixed hydroxide as shown in formula (1). When this hydroxide is oxidized in an aqueous solution under certain conditions, a black spinel compound (ferrite) is formed according to the reaction shown in formula (2). Although the foregoing co-precipitation process has been utilized to remove iron from waste water in the form of ferrite, the process is a non-selective, bulk precipitation process, i.e., substantially all metals in the waste water are precipitated with the ferrite.

In general, the prior art processes are disadvantageous because they are non-selective, bulk precipitation processes, and they require high doses of ferrous ion at a high pH and at high temperatures (60°–70° C.) for excessively long aging times to achieve successful oxidation and the formation of ferrite. Another disadvantage of the prior art co-precipitation process is the requirement of a protracted aging time, e.g., two to three days to permit ferrite product to acquire magnetic properties so that the magnetic ferrite particles can be separated from non-magnetic ferrite particles by a magnetic separator.

SUMMARY OF THE INVENTION

From the foregoing, it can be seen that it would be advantageous to improve the processes for the removal of metals from contaminated water. It would be desirable to selectively remove metals or their oxides or salts from the wastewaters in selective precipitation stages. It would also be desirable to reduce the high doses of ferrous ion, to precipitate metals and their oxides at lower temperatures, e.g., at ambient temperature and/or to reduce the aging time required to achieve successful oxidation and the formation of ferrite. It can also be seen that it would be advantageous to develop a process to treat contaminated waters, for example, acid mine drainage and mineral industries wastewaters, to provide a final product or products which can be conveniently removed from the bulk solution and effectively recovered, a product or products which are saleable and/or have immediate applications and which provide a treated water which meets quality standards for discharge into the environment.

Accordingly, the present invention is directed to a process which substantially overcomes one or more of the problems due to the limitations and disadvantages of the prior art.

Additional features and advantages of the invention will be set forth in the description which follows, and in part will be apparent from the description, or may be learned by practice of the invention. The objectives and other advantages of the invention will be realized and attained by the process particularly pointed out in the written description and claims hereof as well as the appended drawings.

To achieve these and other advantages and in accordance with the purpose of the invention, as embodied and broadly described, the present invention is realized by a process which provides the optional selective recovery from contaminated waters of a non-ferrous and/or non-ferric metal in a first precipitation or the recovery of two or more non-ferrous and/or non-ferric metals in a series of precipitations and the co-precipitation of the ferrous and/or ferric metal and the remaining non-ferrous and/or non-ferric metals in the form of a spinel ferrite in a final stage. In one aspect of the present invention, a precipitate having a high copper content is recovered in a first stage, a precipitate having a high aluminum content is recovered in a second stage and a precipitate of high quality magnetic spinel ferrite is recovered in a third stage.

In another aspect of the present invention, there is provided a process for the treatment of contaminated water which contains non-ferrous and non-ferric main group or transition metals and optionally iron, and the recovery of spinel ferrite therefrom by three process stages as follows:

(a) optionally precipitating and recovering from the contaminated water at least one non-ferrous or non-ferric metal precipitate in at least one metal precipitation stage, each metal precipitation stage being carried out at a pre-selected pH at which said metal is precipitated from the water or at a pre-selected pH at which said metal is precipitated from the water in the presence of an inorganic and/or organic sulfur compound, wherein the sulfur compound has a sulfhydryl group or an ionized sulfhydryl group or a sulfur compound which is capable of producing a sulfhydryl group or an ionized sulfhydryl group, and removing the metal precipitate from the water leaving an aqueous supernatant;

(b) optionally precipitating and recovering aluminum from the contaminated water or from the aqueous supernatant formed in (a) when the contaminated water or aqueous supernatant contains aluminum, in a metal precipitation stage wherein the precipitation is carried out at a pH of about 4 to about 6, preferably at a pH of about 5, at which pH aluminum is precipitated from the water or aqueous supernatant and is removed from the water or aqueous supernatant to form an aqueous supernatant substantially free of aluminum; and (c) precipitating iron and recovering spinel ferrite from the contaminated water or from the aqueous supernatant formed in precipitation stages (a) or (b) in a controlled oxidation precipitation stage wherein the precipitation is carried out at a pH of about 9 to about 12 at which spinel ferrite is precipitated from the water or aqueous supernatant and is removed from the water or aqueous supernatant to form water substantially free of metals.

In accordance with the present invention, the three process stages can be combined as desired, depending upon the initial make-up of the contaminated waters and the desired grade or quality of the precipitated spinel ferrite. The process of stage (c) can be used alone, or it can be used with the process of stage (a) or the process of stage (b) or the process of stage (a) and the process of stage (b). Stage (b) follows stage (a) when both stages are used. Stage (b) can be used alone to recover metal precipitate, e.g., copper, zinc and the like.

By the process of the present invention, most metals which are present in contaminated water can be selectively removed and recovered by a precipitation stage (a) and/or a precipitation stage (b) followed by a precipitation stage (c) where spinel ferrite is formed from iron and metals which have not been precipitated in precipitation stages (a) and/or (b). By selecting the pH or pH range at which the metal precipitates from the contaminated water in the presence of an organic and/or inorganic sulfur compound having a sulfhydryl group or an ionized sulfhydryl group or a compound which is capable of producing a sulfhydryl group or an ionized sulfhydryl group, one skilled in the art by using the process of the present invention, can precipitate most metals (with the exception of aluminum) in contaminated water by using the process in precipitation stage (a) for each metal to be removed from the contaminated water wherein the oxidation-reduction potential of the contaminated water is maintained at a positive potential sufficient to prevent the precipitation of iron at the selected pH or pH range.

It is to be understood that both the foregoing general description and the following detailed description are exemplary and explanatory and are intended to provide further explanation of the invention as claimed.

The accompanying drawings which are included to provide a further understanding of the invention and are incorporated in and constitute a part of this specification, illustrate several embodiments of the invention and together with the description serve to explain the principles of the invention.

BRIEF DESCRIPTION OF THE DRAWINGS

The accompanying drawings, which are incorporated in and constitute a part of this specification, illustrate embodiments of the invention and, together with the description, serve to explain the objects, advantages, and principles of the invention.

In the drawings.

DETAILED DESCRIPTION OF THE INVENTION

Figure 1:
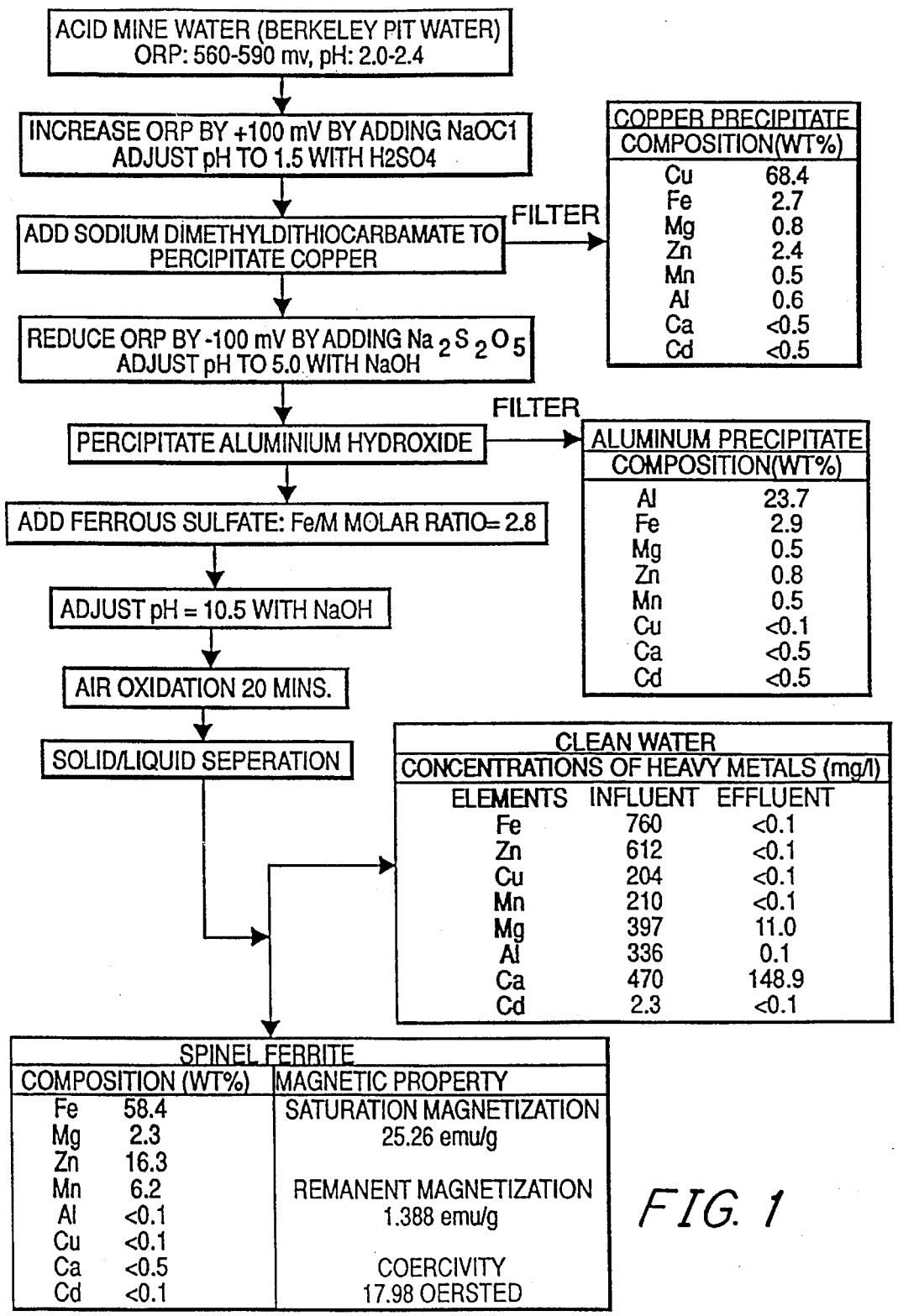
FIG. 1 is a flow chart of a preferred process according to the present invention.

In accordance with the present invention, metal precipitates form in three different stages, a stage where the metal precipitates as a sulfur compound generally defined herein as metal precipitation stage (a), a stage where the metal precipitates as a hydroxide generally defined herein as metal or aluminum precipitation stage (b) and a stage where the metal precipitates as a ferrite generally defined herein as ferrite precipitation stage (c).

In general, in the process of precipitation stage (a), a metal which is to be removed from contaminated water, precipitates in the water at a particular pH in the presence of an inorganic and/or organic sulfur compound having a sulfhydryl group or an ionized sulfhydryl group or a sulfur compound which is capable of producing such a group. When a particular non-ferrous and non-ferric metal is to be precipitated from and removed from contaminated water in the process of stage (a), the pH or pH range at which said metal precipitates from the contaminated water in the presence of the organic and/or inorganic sulfur compound is selected and the pH of the water is adjusted accordingly by means known in the art. If it is desirable to remove more than one non-ferrous/non-ferric metal from the contaminated water, e.g., a first metal and a second metal, it may be necessary to select the pH or pH range at which the first metal can be removed from the water in the presence of the organic and/or inorganic sulfur compound and precipitate and remove the first metal from the water followed by the selection of a pH or pH range at which the second metal can be removed from the water in the presence of the organic and/or inorganic sulfur compound and the precipitation and removal of the second metal. The same procedure can be followed for a third, fourth or fifth metal, and the like. For example, copper can be precipitated from water at any pH of 0 or above, preferably within a pH range of about 1 to about 2, in the presence of the organic and/or inorganic sulfur compound; arsenic can be precipitated at about the same pH as copper in the presence of the organic and/or inorganic sulfur compound; and zinc can be precipitated from water at a pH of about 2.5 or above, preferably at a pH range of about 2.5 to about 3.0 in the presence of the organic and/or inorganic sulfur compound. Aluminum, which is precipitated from water at a pH of about 4 to about 6, preferably at about 5, in a metal hydroxide precipitation stage (b), is discussed separately in more detail below because the precipitation steps for aluminum are different from the precipitation steps for the other non-ferrous/non-ferric metals. Generally, several metals can form a precipitate at a given pH. For example, in certain instances, when Cu, Fe, Mg, Zn, Mn, Al, Cd and Ca are present in wastewater, the copper precipitate also contains small amounts of Fe, Mg, Zn, Mn, Al, Cd and/or Ca and the aluminum precipitate also contains small amounts of Fe, Zn, Cu, Mn, Mg, Ca, and/or Cd.

In the process of metal precipitation stage (a), at least one oxidizing agent is added to the contaminated water to increase the oxidation-reduction potential of the water to a more positive potential to convert iron, if present in the water, to the ferric ion form wherein iron remains dissolved in the water at a preselected pH or pH range at which the metal precipitates from the water in the presence of the organic and/or inorganic sulfur compound. As discussed in more detail below, if iron is not present in the contaminated water, it can be added at any stage of process, however, it is preferred to add iron in the form of a water soluble ferrous salt in ferrite precipitation stage (c). Aqueous acid or base or a mixture thereof is then added to the water having iron, if present, in the form of ferric ion to adjust the pH of the water to said pre-selected pH at which precipitation of said metal occurs in the presence of an organic or inorganic sulfur compound, and a sufficient amount of at least one organic or inorganic sulfur compound or mixture thereof, said sulfur compound having a sulfhydryl group or an ionized sulfhydryl group or a sulfur compound which is capable of producing a sulfhydryl group or an ionized sulfhydryl group, is then added to the water to form a metal precipitate in the water at the adjusted pH. The metal precipitate is removed from the water to form an aqueous supernatant. As discussed above, the process of stage (a) can be repeated at another pH or pH range to selectively remove other metals from the contaminated water, e.g., by using the aqueous supernatant obtained in a previous metal precipitation stage (a) at another pH or pH range to precipitate another metal and to obtain yet another aqueous supernatant. The aqueous supernatant from the process of metal precipitation stage (a) can be used in the process of aluminum precipitation stage (b) or in the process of ferrite precipitation stage (c).

When aluminum is present in the contaminated water or in the aqueous supernatant of metal precipitation stage (a), aluminum is removed by the process of precipitation stage (b) at a pH of about 5. In the process of aluminum precipitation stage (b), at least one reducing agent is added to the contaminated water or aqueous supernatant obtained from the process of metal precipitation stage (a) to adjust the oxidation-reduction potential of the water or aqueous supernatant to a less positive or more negative potential sufficient to convert iron, if present in the water or aqueous supernatant, to the ferrous ion form wherein iron remains dissolved in the water or aqueous supernatant as a ferrous ion at the pH at which aluminum precipitate is formed, i.e., at a pH of about 5. An aqueous acid or base or a mixture thereof is then added to the water or aqueous supernatant having the iron in the form of ferrous ion to adjust the pH to about 5, thereby causing an aluminum precipitate to form. The aluminum precipitate is removed from the water or aqueous supernatant to form an aqueous supernatant which is substantially free of aluminum. The aqueous supernatant which is substantially free of aluminum and is obtained from the process of stage (b) can be used in the process of stage (a) or in the process of stage (c).

Contaminated water can be treated directly in the process of ferrite precipitation stage (c) or the aqueous supernatant from the process of metal precipitation stage (a) or aluminum precipitation stage (b) alone or the process of stage (a) and stage (b) can be treated in the process of stage (c). When the process of stage (a) is used to remove copper from contaminated water, and when the process of stage (b) is used to remove aluminum from the same contaminated water, a very high quality magnetic spinel ferrite is obtained when the water treated by the processes of stages (a) and (b) is treated by the process of stage (c). Furthermore, when the process of stage (a) is used to remove arsenic from contaminated water, and when the process of stage (b) is used to remove aluminum from the same contaminated water, a very high quality magnetic spinel ferrite is obtained when the water treated by the processes of stages (a) and (b) is treated by the process of stage (c). In the preparation of high quality (high grade) magnetic spinel ferrite from contaminated water in accordance with the present invention, it is important that substantially all arsenic and aluminum be removed from the water or aqueous supernatant before the water or aqueous supernatant is treated by the process of stage (c). In accordance with the present invention, high quality magnetic spinel ferrite can also be obtained by treatment of water or aqueous supernatant containing copper in the process of stage (c). It is also possible by the process of the present invention to prepare and recover spinel ferrites which are a lower grade, i.e., which have a lower quality and are marginally magnetic or non-magnetic by removing only part or none of the aluminum and/or arsenic in which case it is possible to omit the arsenic and/or aluminum precipitation stages or to control the process parameters of the respective precipitation stage and/or stages to remove and recover only a part of the aluminum and/or arsenic.

In general, if contaminated water is used directly in the process of stage (c) or if an aqueous supernatant from stage (a) or stage (b) is used in the process of stage (c), the potential of the water or aqueous supernatant must first be adjusted to an oxidation-reduction potential sufficient to convert iron, if present therein, to the ferrous ion form. This is achieved by adding reducing agent in an amount sufficient to reduce the ferric iron to the ferrous ion, generally an amount of reducing agent sufficient to reduce the ORP by about −50 mV to about −250 mV, more preferably about −100 mV. If the aqueous supernatant substantially free of aluminum from the process of stage (b) is used in the process of stage (c), it may have sufficiently low potential so that all the iron is in the ferrous form, and unless it is desirable to provide a less positive or a more negative potential of the aqueous supernatant obtained from stage (b), it is not necessary to treat the supernatant with a reducing agent prior to adding a ferrous salt thereto. In certain instances, one may not choose to convert all or part of the iron in the ferric ion form that may exist in the contaminated water or aqueous supernatant in the ferrite precipitation stage (c) in which case a reducing agent is not employed. However, to provide a molar ratio of ferrous ion to non-ferrous metal ion in the water or aqueous supernatant, one can add a ferrous salt in this stage. During the oxidation in the ferrite precipitation stage (c) with oxidizer, in one example it is preferred that the oxidation-reduction potential of the wastewater or aqueous supernatant in the process of stage (c) reach a potential of about −600 mV to about −800 mV, preferably about −700 mV. Oxidation is stopped at a point prior to a sharp rise in the ORP, e.g., just prior to the sharp rise in ORP in the curve of FIGS. 9 and 11, to prevent the formation of iron oxide from the spinel ferrite. This is generally controlled by controlling the pH and the length of time of the oxidation, i.e., the length of time that oxidizer is added to the water or aqueous supernatant.

Accordingly, in the process of stage (c), a reducing agent may be added to the water or to an aqueous supernatant to adjust the oxidation-reduction potential of the water or aqueous supernatant to a less positive or a more negative potential sufficient to convert iron, if present, in the contaminated water or aqueous supernatant to the ferrous ion form, or a reducing agent may be added to the water or to an aqueous supernatant to increase the negative potential of the water or aqueous supernatant. A stoichiometric amount of water soluble ferrous salt to provide a ferrous ion-containing water having a sufficient amount of ferrous ion to produce metal ferrite from metals dissolved in the ferrous ion-containing water is then added to the water or to aqueous supernatant having a negative potential. If there is no iron in the contaminated water or the aqueous supernatant, the total amount of iron required to produce ferrite from the ferrous ion containing water is derived from the ferrous sulfate. In certain aspects of the present invention, the stoichiometric amount of ferrous ion sufficient to produce ferrite is a ferrous ion to non-ferrous metal ion molar ratio of about 2:1 to about 3:1, more preferably, about 2.8:1, in the ferrous ion containing water. A sufficient amount of aqueous base is then added to the ferrous ion-containing water to adjust the pH of the ferrous ion-containing water to about 9 to about 12, preferably about 10 to about 11, and more preferably, about 10.5, and the ferrous ion-containing water having a pH of about 9 to about 12, preferably about 10 to about 11, and more preferably about 10.5, is then subjected to an oxidizer, e.g., oxygen, for a sufficient amount of time to form spinel ferrite precipitate. The spinel ferrite precipitate is removed from the water to form water substantially free of metals.

Generally, the waters which are treated by the process of the present invention are contaminated with iron metal, iron oxides, and/or iron in the form of ferrous and/or ferric salts, as well as the non-ferrous and non-ferric metals, metal oxides and/or metal salts of copper, zinc, aluminum, manganese, silver, lead, cadmium, gold, nickel, arsenic and the like, as well as the lanthanide and actinide metals. Thus, as used herein, the precipitation of a metal in any of the stages includes the precipitation of the metal and its oxides and salts. In certain instances, the contaminated waters may contain 0% or a very low amount of iron, i.e., an insufficient amount of iron to form a spinel ferrite when the contaminated water is treated in ferrite precipitation process stage (c). When it is desirable to form a spinel ferrite precipitate from such waters containing 0% or an insufficient amount of iron, the iron can be added to the contaminated water in the form of a ferrous salt, e.g., ferrous sulfate, in the stoichiometric amounts discussed above or it can be added in any form of iron in the stoichiometric amounts discussed above as long as it is reduced by the reducing agent used with the process of precipitation stage (c) to convert ferric ion to ferrous ion. In accordance with the present invention, the contaminated water must contain metals from which spinel ferrite can be produced. Accordingly, except for iron, which can be added to the contaminated water or aqueous supernatant, preferably in precipitation stage (c) in the form of a ferrous salt such as, e.g., ferrous sulfate, the contaminated water must contain any combination of Zn, Mn, Mg, Cu, Ni, Cd, Pb and the like and/or the oxides and salts thereof, so that said metals can combine with ferrous ion in precipitation stage (c) to form spinel ferrite. In most instances in the case of wastewater treatment, these metals which form the spinel ferrite are the so-called "heavy metals", i.e., those transition metals which are toxic and will cause environmental harm if discharged into rivers, lakes or other natural water resources. However, the metals which may be recovered from the various precipitation stages or in the spinel ferrite are not limited to the "heavy metals."

In accordance with the present invention, the selective recovery of non-ferrous and/or non-ferric metal or metals is optional depending upon the metals contained in the contaminated water and the desired quality of the spinel ferrite product. If the contaminated water contains aluminum or arsenic, and it is desirable to recover a high grade magnetic spinel ferrite, these metals (or metal salts or oxides) must be removed from the contaminated water because they interfere with and/or prevent the production of high grade magnetic spinel ferrite. Thus, if the contaminated water contains aluminum or arsenic, these metals (including their oxides and salts) are removed from the contaminated water and are selectively recovered as precipitates so that high quality magnetic ferrite can be recovered. In other instances, it may be desirable to selectively remove and recover a metal or metals which have value, e.g., a metal or metals that can be sold to a smelter, from the contaminated waters even though the particular metal or metals would not interfere with or prevent the production of high quality magnetic spinel ferrite and would actually become a substituent in the structure of the spinel ferrite.

Thus, in accordance with certain aspects of the present invention, precipitation stages (a) and/or (b) are optional, and the contaminated water is treated only in final precipitation stage (c), i.e., the spinel ferrite precipitation and recovery stage. Furthermore, precipitation stage (a) may be repeated any number of times to remove a specific metal or metals including their oxides and their salts, from contaminated waters at a specific pH for each metal and in the presence of the specified organic and/or inorganic sulfur compounds which cause the metals to precipitate out at a given pH or pH range.

In one particular aspect of the present invention, there is provided a process for the treatment of water containing iron, copper, aluminum and other metals and the recovery of copper, aluminum and spinel ferrite therefrom by (a) precipitating and recovering copper from the contaminated water in a copper precipitation stage, wherein the precipitation is carried out at a pH of about 1 to about 2, preferably about 1.5, at which copper precipitates from the water by: (i) adding to the contaminated water at least one oxidizing agent in an amount to increase the oxidation-reduction potential (ORP) of the water to a positive e.g., increasing the ORP by at least about +50 mV to about +250 mV, sufficient to convert iron to the ferric ion form wherein iron remains dissolved in the water at a pH of about 1 to about 2; (ii) adding a sufficient amount of aqueous acid or base or a mixture thereof to the contaminated water having iron in the form of ferric ion to adjust the pH of the water to a pH of about 1 to about 2, preferably 1.5, at which precipitation of copper occurs in the presence of certain organic and/or inorganic sulfur compounds; (iii) adding a sufficient amount of at least one organic or inorganic sulfur compound or mixture thereof, said sulfur, compound having a sulfhydryl group or an ionized sulfhydryl group or a sulfur compound which is capable of producing a sulfhydryl group or an ionized sulfhydryl group, to form a copper precipitate in the water at the adjusted pH of about 1 to about 2; and (iv) removing the copper precipitate from the water to form an aqueous supernatant substantially free of said copper; and (v) optionally repeating steps (a)(i) to (a)(iv) if it is desirable to precipitate and recover at least one other metal, e.g., zinc, arsenic or lead and the like, in at least one metal precipitation stage from the aqueous supernatant of (a)(iv) at a preselected pH at which said at least one other metal precipitates from the aqueous supernatant to form a precipitated metal and an aqueous supernatant substantially free of said one other metal.

In accordance with the present invention, substantially all or a portion of a particular metal may be precipitated and removed from metal precipitation stages (a) and/or (b). In certain instances, it may be desirable to leave a portion of the metal, e.g., copper, in the aqueous supernatant so that it will be present in the spinel ferrite. In accordance with the present invention, this can be achieved by the selectivity of the process, and it is possible to leave any portion or percentage of the metal in the aqueous supernatant. For example, if only about 50% of the copper is to be removed from the wastewater, thereby leaving 50% in the aqueous supernatant for use in the ferrite precipitation stage (c), the organic and/or inorganic sulfur compound can be added at a pH different from the optimum pH of about 1.5 to control the precipitation of the copper. One skilled in the art can easily adjust the pH to determine the percentage of metal, e.g., copper, which precipitates from the precipitation stage. Thus, as used herein, removing and recovering at least a portion of at least one metal, e.g., copper, or forming an aqueous supernatant free of at least a portion of said at least one metal, is defined as removing all or any percentage, e.g., about 50%, to about 99%, of the particular metal from wastewater and forming an aqueous supernatant free of the particular metal or containing any percentage, e.g., about 1% to about 50%. As used herein, "substantially" free of aqueous supernatant is used to define aqueous supernatant resulting from the precipitation process of the present invention wherein all but traces, e.g., about 0.01% to about 1.0% by weight, of a particular metal has been removed from the supernatant.

Following the removal of copper and optionally, at least one other metal, the aqueous supernatant is further treated by metal or aluminum precipitation stage (b) by precipitating and recovering aluminum from the contaminated water or from the aqueous supernatant formed in (a)(iv) or (a)(v) in an aluminum precipitation stage wherein the precipitation is carried out at a pH of about 4 to about 6, preferably at about 5 at which aluminum precipitates from the water or aqueous supernatant as a hydroxide by (i) adding to the aqueous supernatant at least one reducing agent to adjust the ORP of the aqueous supernatant to a less positive or a negative potential, e.g., reducing the ORP by at least about −50 to about −250 mV, in an amount sufficient to convert iron to the ferrous ion form wherein iron remains dissolved in the aqueous supernatant as a ferrous ion at a pH of about 5 at which aluminum precipitate is formed; (ii) adding aqueous acid or base or a mixture thereof to the aqueous supernatant having the iron in the form of ferrous ion to adjust the pH to about 5, thereby causing an aluminum precipitate to form; and (iii) removing the aluminum precipitate from the aqueous supernatant substantially free of copper to form an aqueous supernatant substantially free of copper and aluminum.

Following the removal of aluminum, the aqueous supernatant is further treated in a ferrite precipitation stage by precipitating iron and recovering spinel ferrite from the aqueous supernatant formed in aluminum precipitation stage (b) by a process wherein the precipitation is carried out at a pH of about 9 to about 12 under controlled oxidation at which spinel ferrite precipitates from the aqueous supernatant by (i) adding to the aqueous supernatant which does not have a less positive or a negative potential sufficient to maintain iron in the ferrous ion form, at least one reducing agent to adjust the ORP of the aqueous supernatant to a less positive or negative potential sufficient to convert iron in the aqueous supernatant to the ferrous ion form, generally reducing the ORP by about −50 mV to about −250 mV and more preferably reducing the ORP by about −100 mV; (ii) adding a stoichiometric amount of water soluble ferrous salt to the water or to aqueous supernatant having a less positive or a negative potential to provide a ferrous ion-containing water having a sufficient amount of ferrous ion to produce metal ferrite from the other metals in the ferrous ion-containing water, the ferrous sulfate to non-ferrous metal ion ratio being about 2:1 to about 3:1, and preferably about 2.8:1; (iii) adding an amount of aqueous base to the ferrous ion-containing water sufficient to adjust the pH of the ferrous ion-containing water to about 9 to about 12, preferably about 10 to about 11 and most preferably to about 10.5; (iv) subjecting the ferrous ion-containing water having a pH of about 9 to about 12 to an oxidizer, e.g., air from an air sparger, for a sufficient amount of time to form spinel ferrite precipitate; and (v) removing the spinel ferrite precipitate from the water to form water substantially free of metals.

The initial ORP varies with the particular wastewater being treated. In the ferrite precipitation stage, the ORP is reduced by the reducing agent to provide a lowering of the potential to a less positive or a more negative potential sufficient to convert iron which is in the ferric ion form to iron in the ferrous ion form. In one example, the ORP in the ferrite precipitation stage at which the ferric ion is converted to ferrous ion, is about −350 mV. In other examples, the initial ORP starting point may be higher or lower. If iron exists in the ferric ion state, the initial ORP can be reduced by adding a reducing agent to convert the ferric ion to ferrous ion and additional ferrous salt can be added to adjust the stoichiometric amount of ferrous ion to non-ferrous metal ion to about 2:1 to about 3:1, preferably about 2.8:1. When the ferrous ion-containing water in the ferrite precipitation stage is subjected to air (an oxidizer), it is preferably oxidized to a point in the ORP just before the ORP starts to increase sharply, i.e., to the point on the graph in FIG. 11 just before the oxidation curve rises sharply, which in the water used in FIG. 11 was between 180 and 200 minutes, and the ORP was about −350 mV. Oxidation must stop at this point because after this stage, when the ORP increases sharply, the ferrite converts to iron oxide (rust) and the value is lost.

Thus, the oxidizer and length of time of oxidation must be controlled to prevent loss of the spinel ferrite. By following the process of the present invention, one skilled in the art can easily limit the oxidation to prevent loss of spinel ferrite by monitoring and controlling the ORP through pH level and/or length of time of oxidation by devices well-known in the art. In certain examples, during air oxidation and depending upon the initial ORP of the wastewater and the particular ferrite product or products formed during the ferrite precipitation stage, the ORP is reduced to about −600 mV to about −800 mV, preferably to about −700 mV.

Acid mine water obtained from the Berkeley Pit in Butte, Mont. having an initial ORP of about +560–590 mV and a pH of about 2.0 to about 2.4 was treated by the foregoing process in which copper was removed from the acid mine water in precipitation stage (a); the aqueous supernatant or filtrate having the copper removed therefrom was then treated to remove aluminum by the process of precipitation stage (b); and after the aluminum was removed, the aqueous supernatant or filtrate was treated to form magnetic spinel ferrite and clean water at ambient temperature in precipitation stage (c). This process and the resulting products are shown in the flow chart of FIG. 1. The spinel ferrite obtained by the process and prepared at ambient temperature was of high grade magnetic quality. The clean water was suitable for returning to the environment or suitable for additional treatment, e.g., by reverse osmosis, for conversion to potable water. The copper precipitate and aluminum precipitate obtained in the process were of suitable quality to be used by smelters for the production of copper and aluminum products or by-products. The weight percent of copper (on a dry weight basis) in the precipitate from the copper precipitation stage was 68.4%, and the weight percent of aluminum (on a dry weight basis) from the aluminum precipitation stage was 23.70%. The schematic representation of the process of FIG. 1 is shown in FIG. 2 which is discussed in more detail below.

The process of the present invention can be carried out manually or automatically and it can be run intermittently or continuously. In accordance with preferred embodiments, the process is run continuously.

Figure 2:
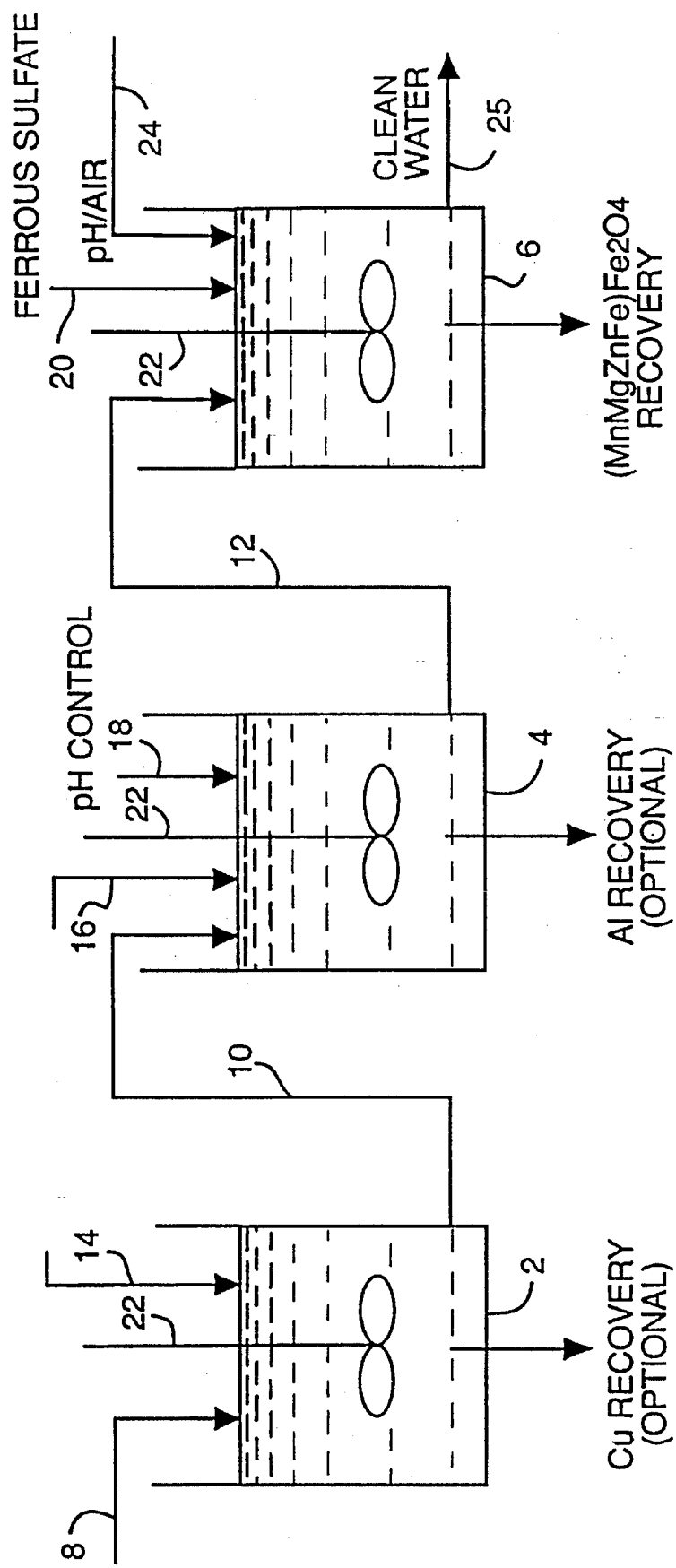
FIG. 2 is a schematic representation of a system showing a three-stage process according to the present invention.
Figure 4:
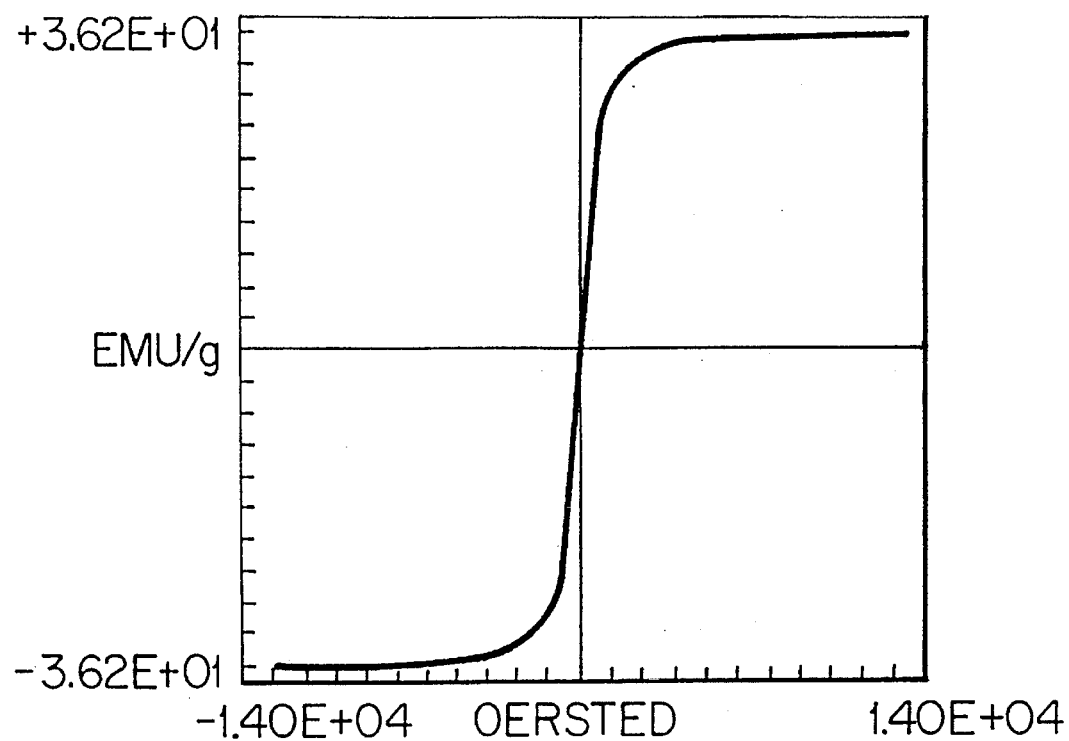
FIG. 4 is a magnetization curve of a spinel ferrite prepared in accordance with the process of the present invention.

The spinel ferrite product obtained by the process described above and as shown in FIG. 1 was of high magnetic quality as can be seen in the graph shown in FIG. 4. The measurements for the data used in the graph were collected on a vibrating sample magnetometer to obtain the magnetization curve of the room temperature spinel ferrite obtained by the process shown in FIG. 1. The data from which the graph was obtained is shown in the Table below:

| DATA FROM THE VIBRATING SAMPLE MAGNETO-METER FOR SPINEL FERRITE OBTAINED BY THE PROCESS SHOWN IN FIG. 1 | | | |
| --- | --- | --- | --- |
| Temp 28.3 | | Start Time: | 16:17:10 |
| | | Duration: | 00:09:11 |
| SIGMA | $3.615E + 01$ | Mass | $5.000E - 03$ |
| Y units | EMU/g | X units | Oersted |
| Hmax | $1.400E + 04$ | | |
| Ss | $3.615E + 01$ | | |
| Sr | $7.187E - 01$ | | |
| SQ | $1.988E - 02$ | | |
| S* | $5.440E - 15$ | | |
| Hc | $1.310E + 01$ | Angle | $0.000E + 00$ |
| dH | $1.310E + 01$ | | |
| Sfd | $1.000E + 00$ | | |

Figure 5:
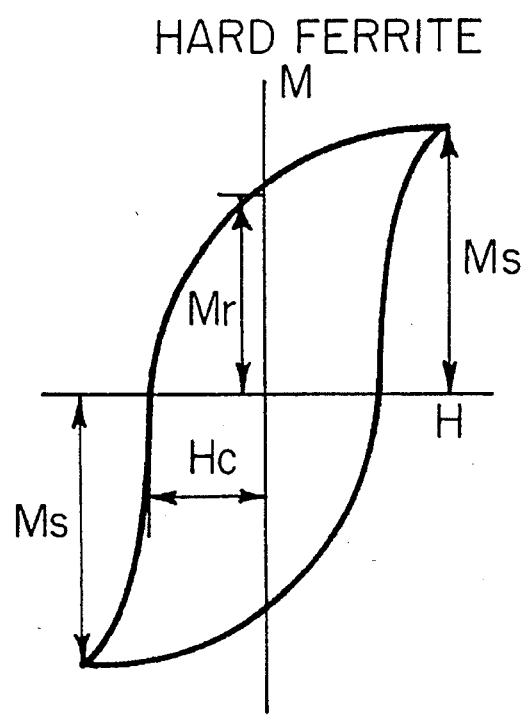
FIG. 5 is a graph representing the reported magnetic properties of hard spinel ferrite precipitated from a synthetic solution.
Figure 12D:
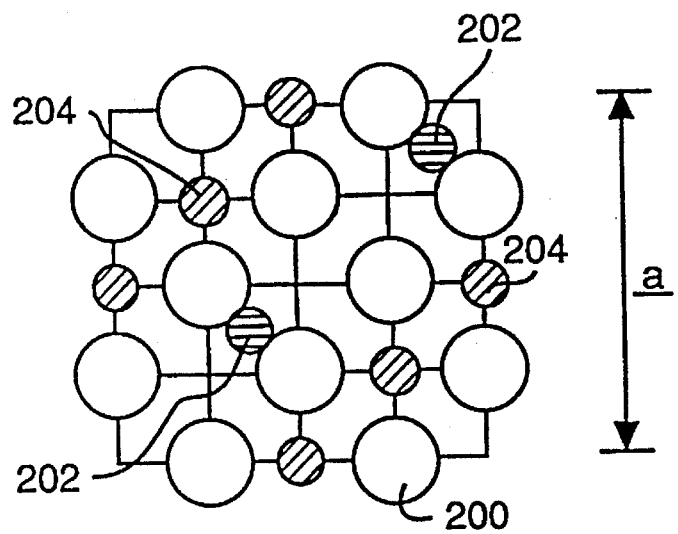
FIG. 12(a) to FIG. 12(d) are illustrations of the layer-by-layer structure of spinel ferrite.
Figure 6:
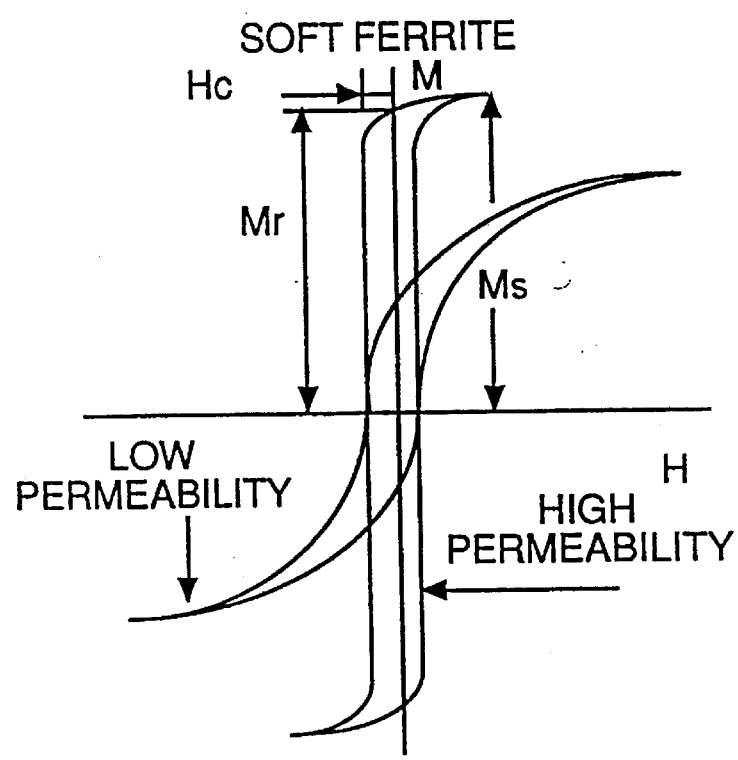
FIG. 6 is a graph representing the reported magnetic properties of soft spinel ferrite precipitated from a synthetic solution.

For comparison purposes, the reported magnetic properties of hard spinel ferrite are shown in the graph of FIG. 5 and the reported magnetic properties of soft spinel ferrite are shown in FIG. 6. FIG. 5 and FIG. 6 represent magnetic properties and were obtained for spinel ferrite precipitated from synthetic solutions and were not made by the process of the present invention. In FIGS. 5 and 6, Ms is saturation magnetization; Mr is remnant magnetization or remanence; Hc is coercive field or coercivity; the abscissa (X-axis) is in Oersteds; and the ordinate (Y-axis) is in EMU/g as in FIG. 4. As seen from the graph in FIG. 4, the ambient temperature spinel ferrite product prepared in accordance with the process of the present invention as described above and shown in FIG. 1, has good magnetic saturation, high coercivity and high permeability. Furthermore, as seen from the flow chart of FIG. 1, the treated water after precipitation is extremely clean and can be discharged to the environment, e.g., for irrigation, or further treated to convert to process waters or potable water as desired.

Figure 7:
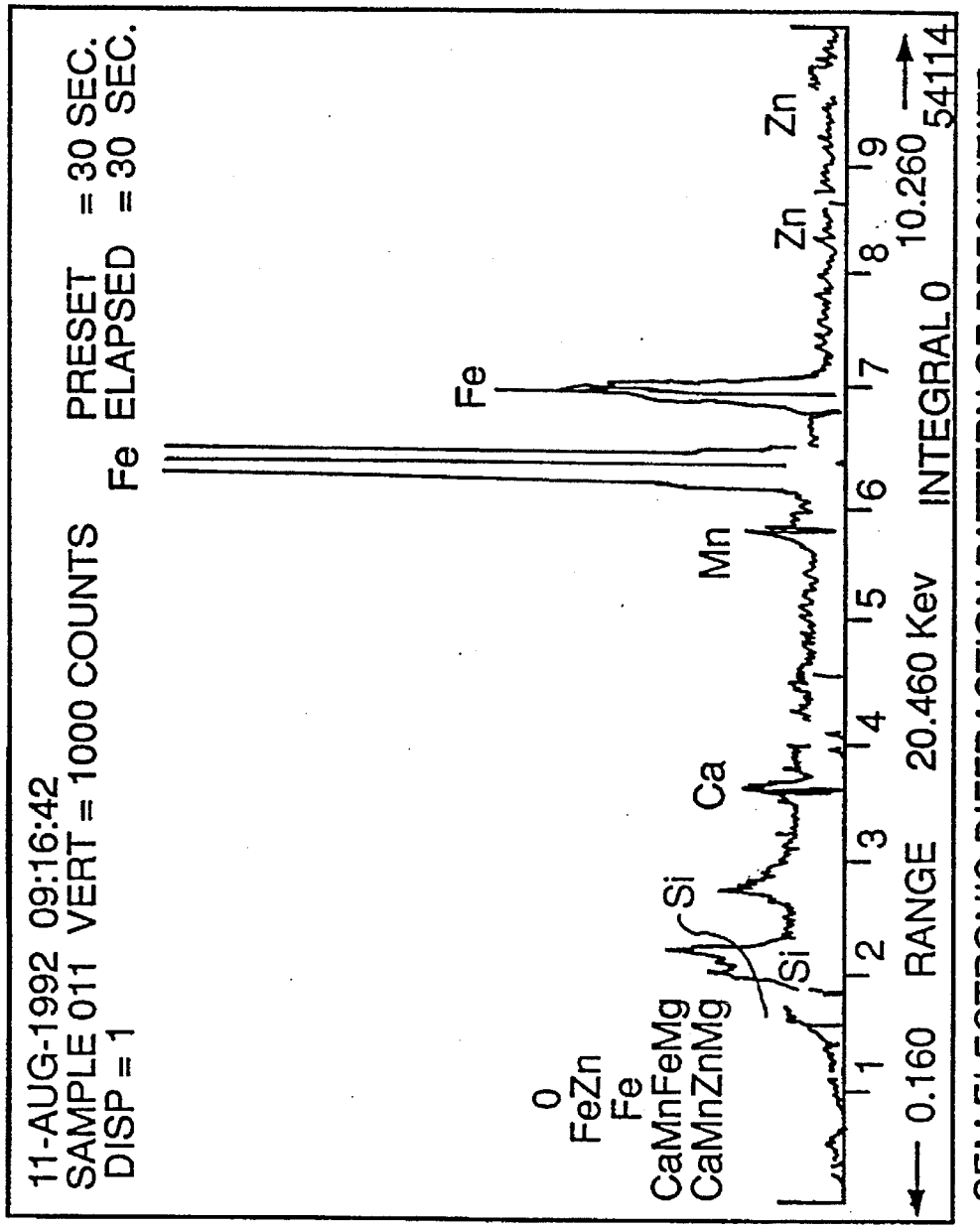
FIG. 7 is a scanning electron microscopic energy dispersive analysis of a magnetic spinel ferrite prepared by the process of the present invention.
Figure 8:
FIG. 8 is a photograph of a scanning electron micrograph of precipitated particles of spinel ferrite prepared by the process of the present invention.

The scanning electron microscope (SEM) energy dispersive analysis of the ambient temperature magnetic spinel ferrite obtained by the process shown in FIG. 1 is displayed in the pattern reproduced in FIG. 7 which shows the amount of iron, manganese, zinc, calcium, potassium, manganese and silicon in the spinel ferrite. The SEM energy dispersive analysis was obtained using a conventional JOEL-JCM-840A scanning electron microscope. A photograph of the SEM of the ambient temperature magnetic spinel product (precipitate) prepared by the process of FIG. 1 is shown in FIG. 8.

Figure 9:
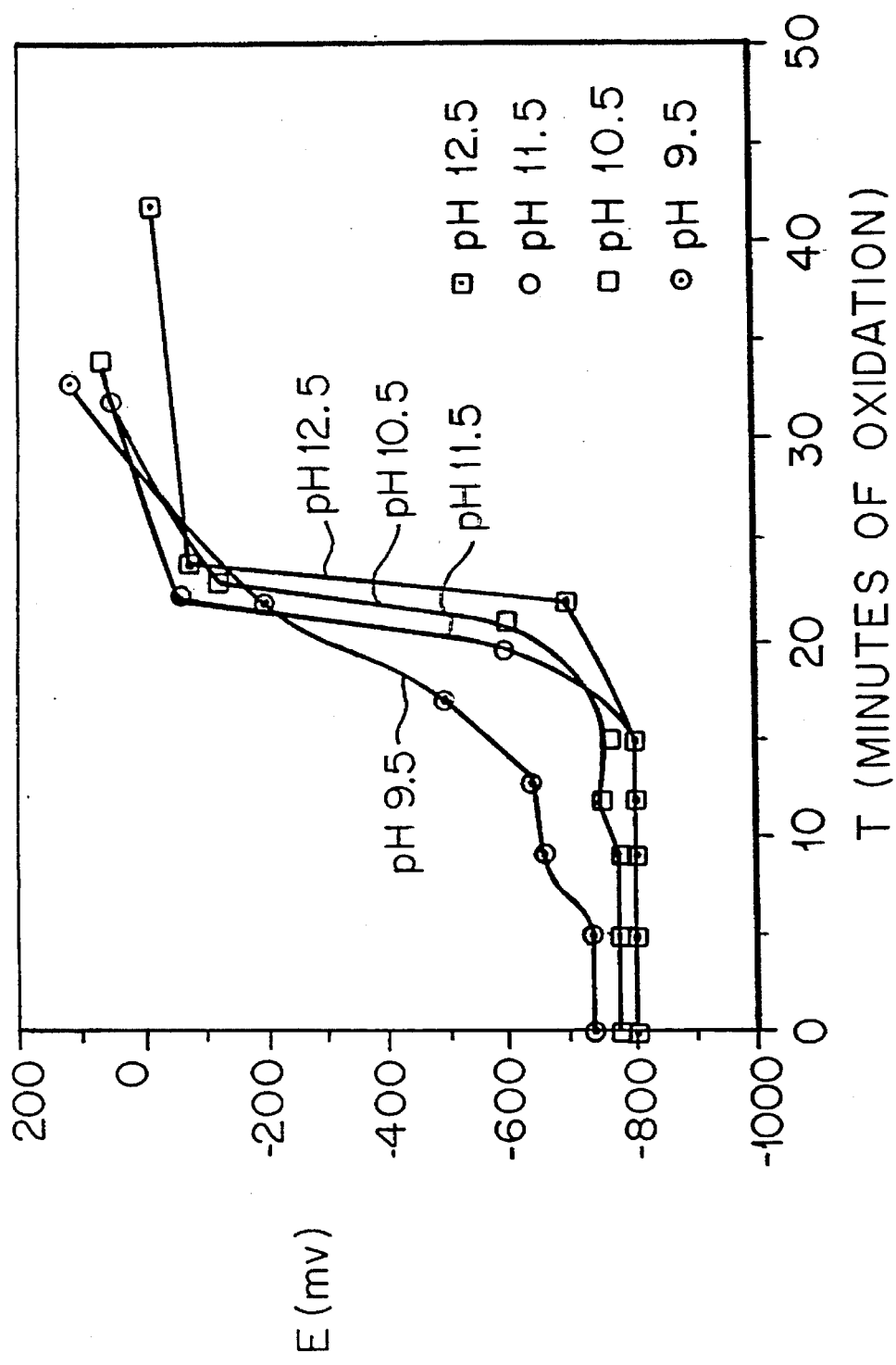
FIG. 9 is a graph representing the relationship between oxidation-reduction potential and oxidation time at various pH values for spinel ferrite precipitate formation during oxidation with air by the process of the present invention.

The graph in FIG. 9 shows the difference in ORP and oxidation time at different pH values when the ferrite precipitation stage is carried out at different pH values. The flat data line on the left side of the graph is the optimum ORP, i.e., at about − 720 mV to about −800 mV. The preferred pH for the spinel ferrite precipitation stage (precipitation stage (c)) was 10.5.

Figure 10:
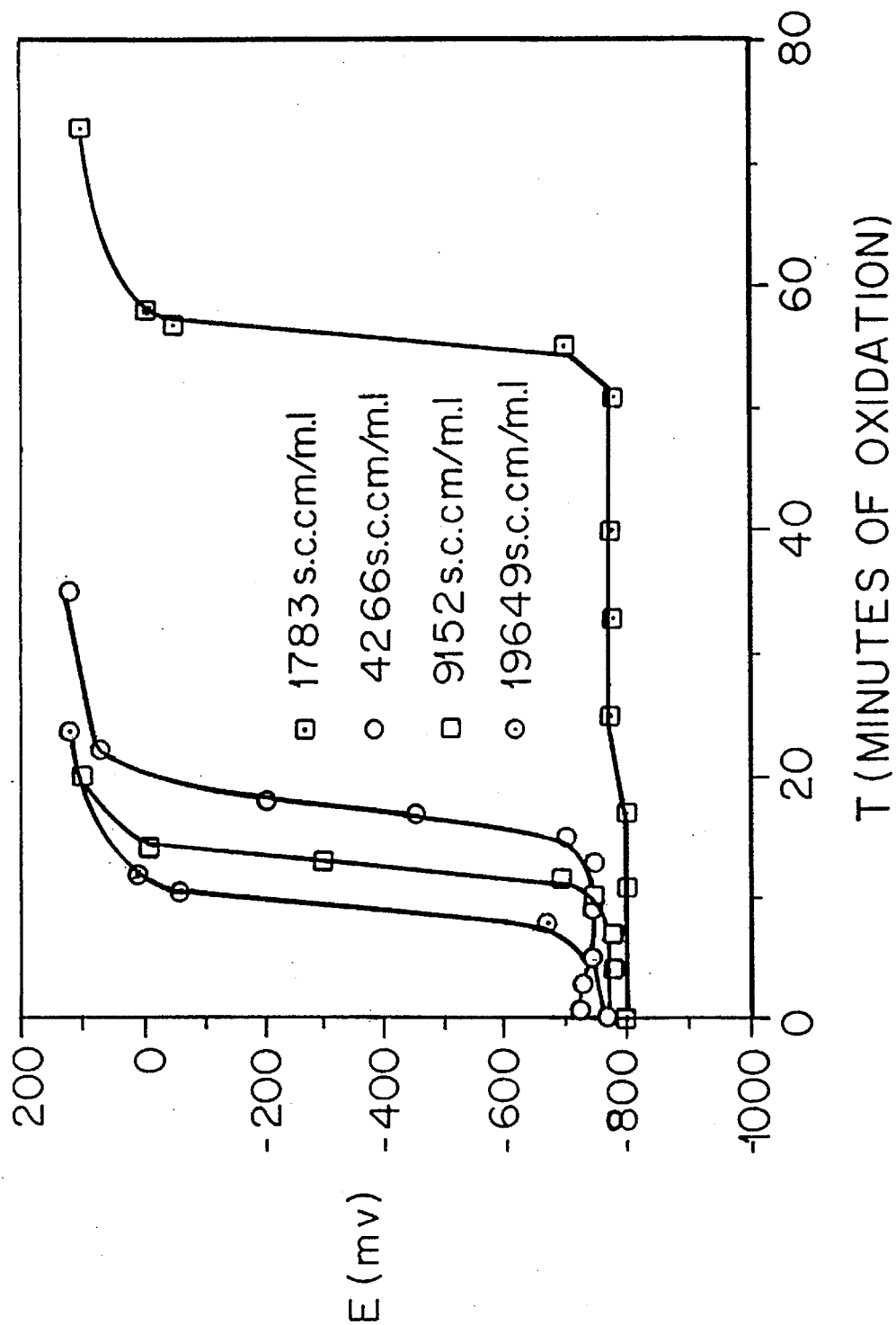
FIG. 10 is a graph representing the relationship between oxidation-reduction value and oxidation time for spinel ferrite precipitate formation by the process of the present invention at different air flow rates using an air sparging unit.

Referring to FIG. 10, the relationship is shown between the ORP value of the magnetic spinel ferrite precipitate (in suspension) and oxidation time at different amounts of air flow using a 10-micron air sparging unit which produces finely-dispersed air bubbles. The optimum ORP is the flat line on the left of the graph. When the ORP value rapidly (sharply) increases, i.e., in the direction of −800 to 0, the iron is no longer in the ferrite form but is present as the metal oxide. This is also true for the data shown in FIG. 9, i.e., as the ORP value changes in the direction of −800 to 0, the iron is no longer in the spinel ferrite form but changes to the metal oxide form. As seen by the data in FIG. 10, there is no optimum air flow rate unless there is a goal to achieve a process time specification. For better control, and in accordance with the preferred embodiments of the present invention, an air sparging unit is used to introduce the oxidizer, i.e., air, into the aqueous medium of the spinel ferrite precipitation stage (c). The data in FIG. 10 was measured at varying flow rates at 1,783 s.c. cm/m.l, at 4,266 s.c. cm/m.l, at 9,152 s.c. cm/m.l and 19,649 s.c. cm/m.l.

Figure 11:
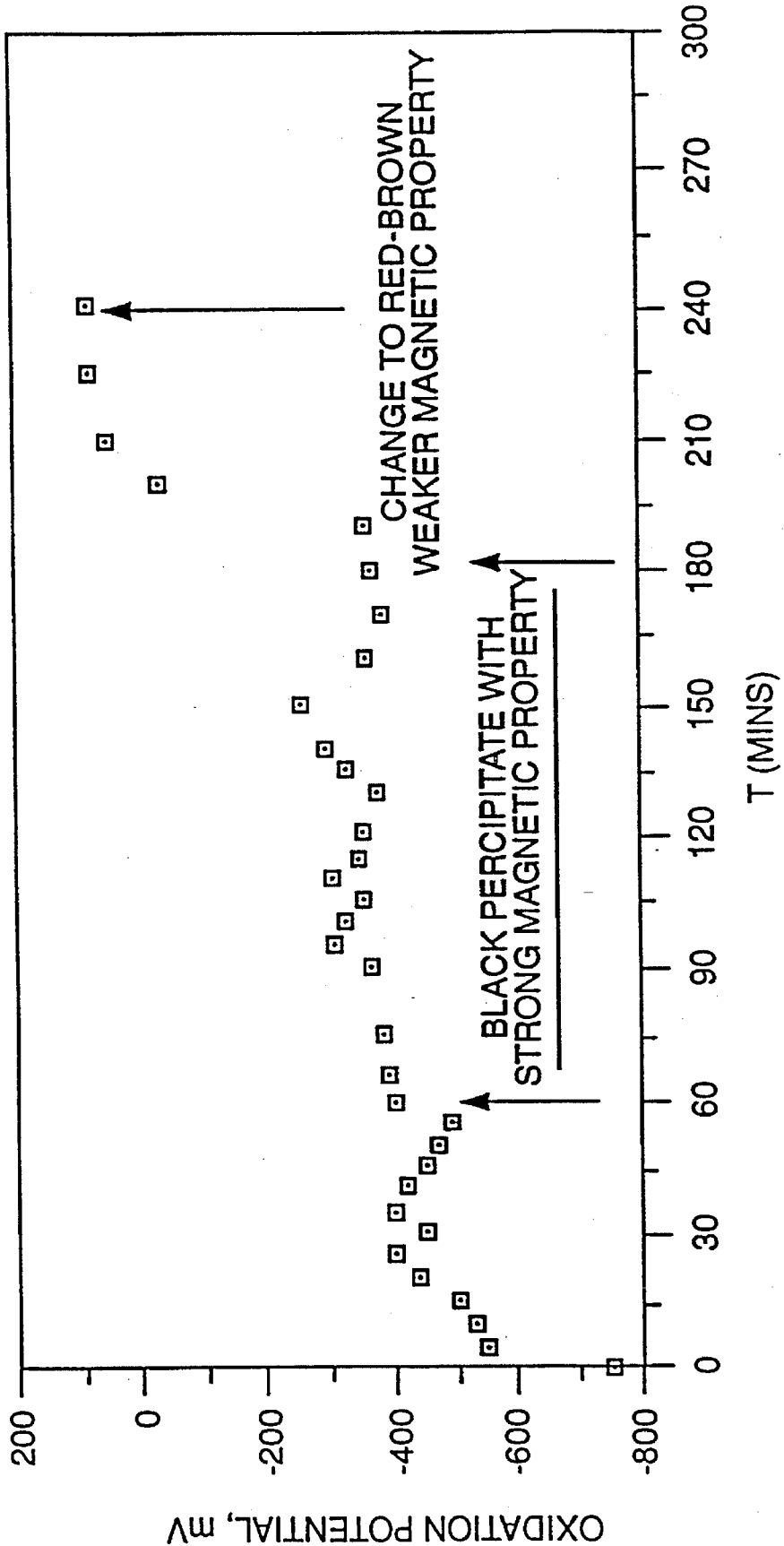
FIG. 11 is a graph representing the relationship between oxidation-reduction potential value and oxidation time for spinel ferrite precipitate formation by the process of the present invention during oxidation with air using a nose bubbler.
Figure 12A:
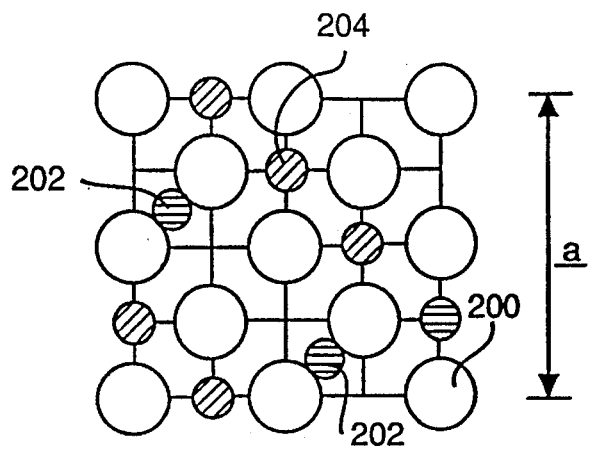
Figure 12B:
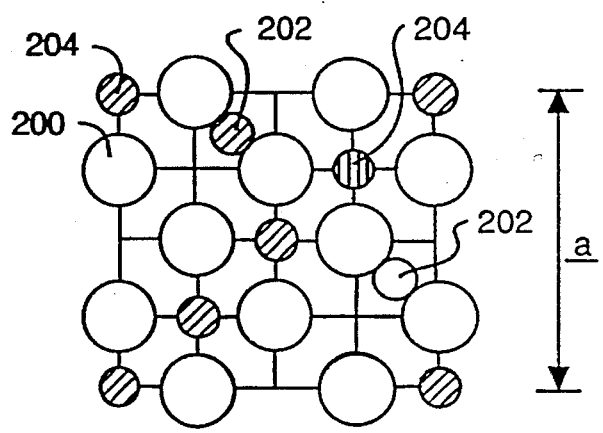
Figure 12C:
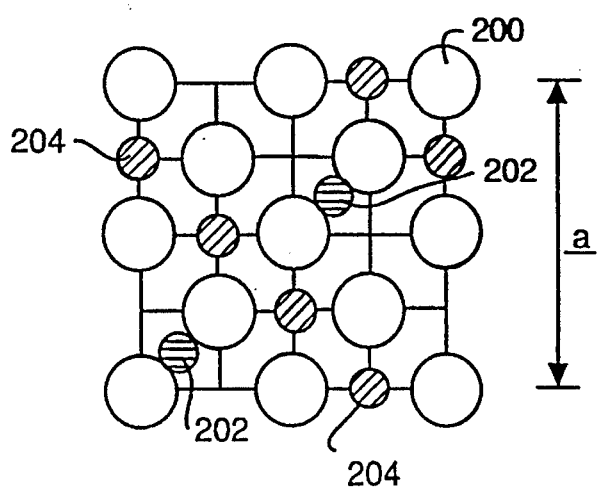

Referring to FIG. 11, the data for ORP versus time (in minutes) were plotted for air supplied as an oxidizer in precipitation stage (c) for the precipitation and recovery of spinel ferrite. The data represented in FIG. 11 was collected when air was bubbled into the aqueous solution of the spinel ferrite precipitation stage (c) by a nose-bubbling unit. It has been found that there is less control of oxidation when this type of air bubbler is used in the process rather than when air is introduced by the air sparging unit.

Referring to FIG. 2, there is shown a schematic process of the three precipitation units which can be used to carry out the process in accordance with the present invention. In FIG. 2, three precipitation stages or tanks, 2, 4 and 6, are shown for the treatment of contaminated waters, e.g., the acid mine water, from Berkeley pit containing iron, manganese, copper, magnesium, aluminum and zinc as used in the process of FIG. 1. Precipitation stage 2 and precipitation stage 4 are shown as optional. Precipitation stage 2 is only used if it is desired to recover a non-ferrous or non-ferric metal from the contaminated water, e.g., copper, zinc, lead, arsenic and the like. If it is desirable to remove and recover aluminum from the contaminated water, then precipitation stage 4 is used for aluminum precipitation and recovery. In certain cases in accordance with the present invention, it is desirable to use only precipitation stage 6 for the production of spinel ferrite and clean water when aluminum recovery is not desired or required and when copper removal and recovery or the recovery and removal of at least one other metal, e.g., Cu, Zn, Pb, As and the like, in the contaminated water is not desired or required. In the event that it is desirable to precipitate and recover more than one non-ferrous or non-ferric metal (other than aluminum), from contaminated water, then the embodiment shown in FIG. 2 would have a plurality of precipitation stages 2, for example, a first precipitation stage 2 for copper recovery connected to a second precipitation stage 2 for lead recovery connected to a third precipitation stage 2 for zinc recovery and the like, arranged such that the supernatant from the previous stage 2 would be processed in the following precipitation stage 2 so that the supernatant from the first stage 2 would flow through conduit 10 to the second precipitation stage 2 and the supernatant from the second precipitation stage 2 would flow through a second conduit 10 to a third precipitation stage 2 and the like.

As shown in FIG. 2, contaminated water is introduced into precipitation stage 2 through conduit 8. If precipitation stage 2 is not used, then contaminated water can be introduced through a conduit directly into precipitation stage 4 or directly into precipitation stage 6 if precipitation stage 4 is not used. Oxidizing agent, e.g., sodium hypochlorite (bleach), to adjust ORP, acid, e.g., sulfuric acid, to adjust the pH and an organic or inorganic sulfur compound, e.g., sodium dimethyldithiocarbamate, are introduced into precipitation stage 2 through conduit 14 and mixed with the contaminated water by appropriate means, e.g., stirrer 22. Copper which precipitates in tank 2, can be recovered by filtration or by decanting, and the supernatant therefrom passes through conduit 10 to precipitation stage 4 for further treatment, or if aluminum recovery is not desired, the supernatant can be passed through conduit 10 directly to precipitation stage 6.

In precipitation stage 4, the supernatant is mixed by stirrer 22 with a reducing agent, e.g., sodium metabisulfite, and the pH is adjusted to about 5.0 by using a base, e.g., sodium hydroxide. The sodium hydroxide to adjust pH and sodium metabisulfite to control the ORP are introduced through conduit 16. A pH control unit to automatically measure and control the amount of base (or acid) introduced into precipitation stage 4 is represented by numeral 18. A similar pH control can also be used to measure the amount of acid (or base) added through conduit 14 in precipitation stage 2 and can also be used to measure and control the amount of aqueous base, e.g., sodium hydroxide, introduced into precipitation stage 6. pH controllers are well-known in the art and are sold by The Cole-Parmer Instrument Co. (Nile, Ill.), The Foxboro Company (Foxboro, Mass.) and Omega Engineering, Inc. (Stamford Conn. Aluminum precipitates in precipitation stage 4 in the form of aluminum hydroxide, and the supernatant recovered therefrom after filtration or decanting or other separation means, is passed through conduit 12 to precipitation stage 6 where it is mixed by stirrer 22 with a water soluble ferrous salt, e.g., ferrous sulfate 20, base, e.g., NaOH, added at 24 to control the pH and an oxidizer, such as air added at 24 for oxidation. The spinel ferrite precipitates in tank 6 and can be separated from the aqueous medium as desired by filtration or decanting and the like to form clean water 25. In FIG. 2, the spinel ferrite is shown as $(MnMgZnFe)Fe_2O_4$. The spinel ferrite can be properly aged as desired by permitting the product to stand at room temperature for any desirable length of time, e.g., from 7 minutes to 48 hours, preferably for about 15 to about 25 minutes in the form of a sludge.

The process conditions of the present invention permit the ferrite precipitation and recovery stage 6 to be carried out at room temperature, i.e., about 25° C. to about 32° C. Although higher temperatures may be used in ferrite precipitation and recovery stage 6 in accordance with the present invention, e.g., temperatures up to 70° C. or higher, there is no advantage in the process of the present invention in utilizing temperatures above room temperature.

Figure 3:
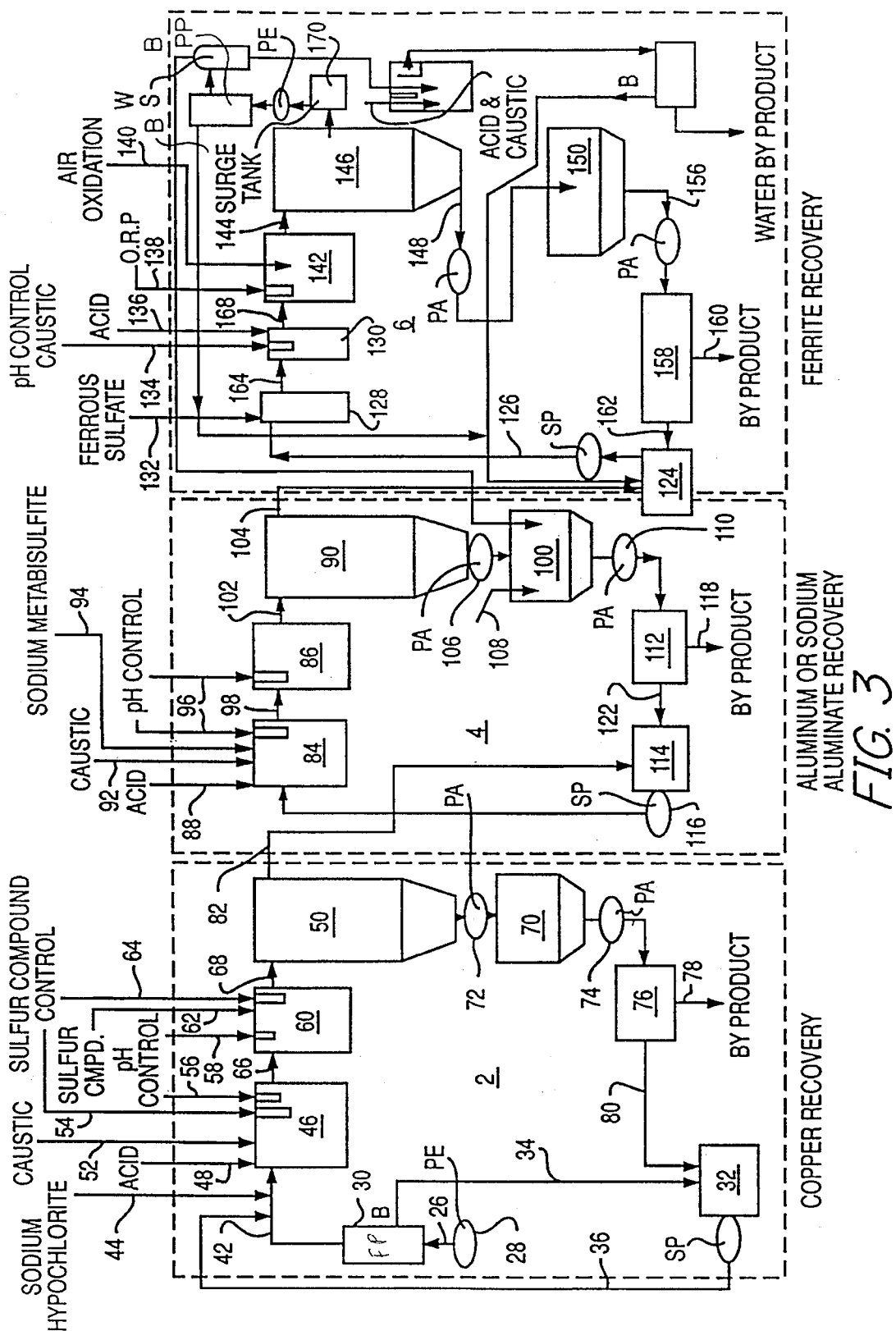
FIG. 3 is a detailed schematic representation of a system showing a three-stage process according to the present invention.

Referring to FIG. 3, there is shown a more detailed schematic representation of the 3-stage system having a copper recovery stage 2, an aluminum recovery stage 4 and a spinel ferrite recovery stage 6.

In FIG. 3, a source of contaminated water, e.g., acid mine water (not shown), passes through conduit 26 into a 10–15 micron centrifugal separation particulate filter 30 to remove suspended solids by filtration by means of a suitable electric-powered pump 28. Excess surges of contaminated water can pass from filter 30 into surge tank 32 by conduit 38. Water from surge tank 32 can pass by means of conduit 36 to conduit 42 where it can be used in reaction tank 46. Filtered water from filter 30 passes through conduit 42 into reaction tank 46 in the copper recovery stage 2 where copper is recovered from a filter press 76 as a by-product at 78.

In precipitation stage 2, the ORP of the incoming water is raised to a positive potential (about +100 mV vs. Ag/AgCl or higher) using sodium hypochlorite to oxidize all of the ferrous ion to ferric ion. Conventional oxidizing agents, such as bleaching agents, which are well known in the art may be used in the process of the present invention and include, e.g., but are not limited to, sodium hypochlorite, hydrogen peroxide, sodium peroxide, sodium chlorite, calcium hypochlorite, hypochlorous acid, sodium perborate, dichlorodimethylhydantoin and the like. The oxidizing agent is added in an amount sufficient to increase the ORP of the water to a more positive potential by at least about +50 mV to about +250 mV or higher. The ORP can be monitored and controlled by ORP controllers well-known in the art. For example, if the ORP of the contaminated water is about 560–590 mV, an amount of sodium hypochlorite sufficient to raise the ORP of the contaminated water to about 660 mV to about 690 mV is added to the contaminated water through conduit 44 into the contaminated water, preferably through conduit 42. The conversion of the ferrous ion to ferric ion improves the selectivity of the metal removal and inhibits the precipitation of the iron in the copper recovery precipitation stage. The pH of the water is then adjusted in reaction tank 46 to a pH of about 1 to about 2 and preferably to about 1.5 with acid and/or base, preferably sulfuric acid and/or sodium hydroxide. In the embodiment shown, sulfuric is added through conduit 48 to reaction tank 46 and aqueous base (caustic) is added through conduit 52 to reaction tank 46. Any suitable pH control device 56 and 58 well-known in the art and described above may be used to control the addition of acid 48 and base 52 into reaction tank 46 to maintain the pH range between about 1 and about 2, preferably at about 1.5. After about 30 minutes, the mixture of reaction tank 46 is passed by conduit 66 into a reaction tank 60 where a sulfur-containing organic and/or inorganic compound, e.g., BUFLOC 528, is added to precipitate the copper from the water.

As used herein, the organic or inorganic sulfur compound or mixture thereof is a sulfur compound having a sulfhydryl group or an ionized sulfhydryl group or a sulfur compound which is capable of producing a sulfhydryl group or an ionized sulfhydryl group. It is added in an amount sufficient to form the copper precipitate in the contaminated water at a pH of about 1 to about 2. In general, the organic and inorganic sulfur compounds of the present invention include any sulfur compound which has a sulfhydryl (—SH) group or an ionized sulfhydryl group (—S(–1)). Compounds containing a sulfhydryl or an ionized sulfhydryl group include hydrogen sulfide and inorganic compounds containing sulfide ion, hydrosulfide ion or trithiocarbonate ion as well as organic compounds such as dithiocarbamates, xanthates, mercaptans and the soluble metal salts of these compounds, i.e., the alkali metal and alkaline earth metal salts. Furthermore, sulfur compounds which are capable of producing a sulfhydryl or an ionized sulfhydryl group may be used in the composition and process of the present invention, and include such sulfur compounds as thioacetamide and reducible disulfides. Sulfur-containing amino acids (such as cysteine, cystine and glutathione) and peptides (synthetic as well as naturally-occurring) or proteins that include sulfur-containing amino acids are also sulfur compounds which have sulfhydryl or ionized sulfhydryl groups and may be used as sulfur compounds in accordance with the present invention.

Examples of organic sulfur compounds which may be used in the present invention, include sodium, potassium or calcium salts of the following ions: ethyl xanthate ion, glucose xanthate ion, isopropyl xanthate ion, dimethyldithiocarbamate ion or diethyldithiocarbamate ion. Examples of inorganic sulfur compounds which may be used in the present invention, include sodium trithiocarbonate, potassium trithiocarbonate, calcium trithiocarbonate, sodium sulfide, potassium sulfide or calcium sulfide, i.e., sulfur compounds of metals which generally have relatively low toxicity in water as well-known in the art. In a preferred embodiment of the present invention, BUFLOC 528, a trade name used by Buckman Laboratories, International, Inc., for a 40% solution of sodium dimethyldithiocarbamate is added to reaction tank 60 through conduit 42 in an amount sufficient to form a copper precipitate at a pH of about 1 to about 2.

An element of the pH control 56 of reaction tank 46 is also positioned in reaction tank 60 and is identified by 58. By this pH control system which is well-known in the art, the pH of reaction tanks 46 and 60 can be maintained at a pH of about 1 to about 2, preferably about 1.5 for copper or at any other desired pH for the specified metal being recovered, e.g., at about 2.5 to about 3.0 for zinc precipitation and the like.

In accordance with the process of the present invention, the pH control, the oxidizing and/or reducing agents and the sulfur can be controlled manually or by any suitable or conventional control and metering devices.

In accordance with the present invention, the ORP and pH may be monitored and controlled by conventional systems well-known in the art. For example, the pH may be monitored and controlled by adding acid or base by pH controllers sold by The Cole-Parmer Instrument Co., The Foxboro Company and Omega Engineering, Inc. The ORP may be monitored and the oxidizing or reducing agent may be added to adjust or control the ORP by using ORP controllers sold by the same companies.

In accordance with one aspect of the present invention, the addition of the organic and/or inorganic sulfur compound through conduit 62 to reaction tank 60 can be achieved by a device using a voltametric sensor as defined and claimed in the United States Patent Application of Thomas E. McNeel for "A Method and Apparatus for Controlling the Feed of Water Treatment Chemicals Using A Voltametric Sensor," filed concurrently herewith and assigned to a common assignee of the present invention and incorporated herein in its entirety. In this control system, an external voltage is applied across a reference electrode and a working electrode in a solution to be treated; a current that flows through the working electrode is measured; the measured current is converted to a voltage which is proportional to the amount of treatment chemical in the solution to be treated; and the converted voltage is amplified to produce a feedback signal. In another aspect of the control system, a desired external voltage is applied, measured between a reference electrode and working electrode across a counter electrode and working electrode in the solution to be treated, using the working electrode to measure a current that flows through the solution, converting the measured current into a voltage which is proportional to an amount of treatment chemical in the solution to be treated, and amplifying the converted voltage to produce a feedback signal.

In controlling the feed of water treatment chemicals, i.e., the organic and/or inorganic sulfur compounds, e.g., BUFLOC 528, feedback can be determined by taking electrochemical measurements using voltametric techniques which involve the application of a voltage across two electrodes in a solution and the measurement of the current that flows between the electrodes. The electrode at which the desired oxidation or reduction takes place, is called the working electrode, and the applied potential (voltage) on the surface of this electrode is measured against the same type of reference electrode that is used to make potentiometric measurements. In the present process involving the use of dimethyldithiocarbamate ions to precipitate metal ions from wastewater, dimethyldithiocarbamate ions are oxidized at the working electrode at an applied potential of +300 millivolts vs. Ag/AgCl. The working electrode measures an electric current flowing through the solution as a result of this oxidation reaction directly proportional to the level of dithiocarbamate ions in the water and thus may be amplified for use as a feedback signal to control the pump feeding dithiocarbamate ions into the system.

The controller ensures that the maximum amount of copper is extracted (precipitated) from the water while controlling the dosage level of the sulfur compound. This control is beneficial in that it will compensate for contaminated water having fluctuating concentrations of metal or varying flow rate and has the capability of measuring the concentration of the sulfur compound in the presence of interfering substances. By using this controller system in the process of the present invention, overfeeding and underfeeding of the sulfur compound to reaction tank 60 is avoided or minimized.

The water and the precipitated solids from reaction tank 60 are transferred by means of conduit 68 to clarifier 50 where the solids build in size and settle to the bottom where aging of the sludge can occur if desired. The solids are then transferred from clarifier 50 to sludge thickening tank 70 by means of a suitable pump and conduit 72 and thereafter are transferred to filter press 76 by a suitable pump and diaphragm 74. Water from filter press 76 is transferred by conduit 80 to surge tank 32 for re-use.

The supernatant from clarifier 50 is transferred by conduit 82 to precipitation stage 4 for the removal of and recovery of aluminum.

The chemical reaction in copper recovery stage 2 is shown by the following chemical equations:
Oxidation of Iron:

$$HClO + 2Fe(++) \rightarrow 2Fe(+++) + Cl(-) + OH(-)$$

Precipitation of Copper $$2((CH_3)_2\text{—N—C—S}_2(-)) + Cu(++) \rightarrow (CH_3)_2\text{—N—C—S}_2\text{—Cu—S}_2\text{—C—N—}(CH_3)_2$$

In aluminum recovery stage 4, the ORP of the water is reduced to a more negative potential of about −100 mV vs. Ag/Ag Cl or lower by adding a reducing agent 94, e.g., sodium metabisulfite to the supernatant from conduit 82 in reaction tank 84.

The sodium metabisulfite is added in an amount to reduce all of the ferric ion to ferrous ion which will prevent the co-precipitation of ferric hydroxide with aluminum hydroxide in reaction tanks 84 and 86. Any conventional reducing agent may be used in the process of the present invention including, for example, but not limited to, sodium hydrosulfite, sodium ascorbate, sodium thiosulfate, sodium borohydride and the like. The amount of reducing agent may be controlled by conventional ORP controllers well known in the art.

The pH of the water in reaction tank 84 is adjusted to about 5.0 by the addition of base and/or acid, e.g., sodium hydroxide and/or sulfuric acid. As used herein, including the base and for acid added in other precipitation stages, any conventional aqueous base may be used to raise the pH and any conventional aqueous acid may be used to lower the pH. Examples of inorganic and organic acids include sulfuric acid, hydrochloric acid, phosphoric acid, acetic acid, nitric acid and the like. Conventional inorganic and organic bases include e.g., aqueous metal alkali such as sodium hydroxide, potassium hydroxide and the like, aqueous alkaline earth metal alkali such as calcium hydroxide, magnesium hydroxide and the like, and organic bases such as amines and carboxylate salts and the like. The pH control system 96 may be any suitable means for controlling and monitoring the pH and may be used in conjunction with automatic metering means for dispensing acid and/or base into reaction tank 84 to maintain the pH at about 5.0, e.g., by using the pH controllers discussed above.

The treated water is maintained in reaction tank 84 preferably for about 30 minutes and thereafter passes by conduit 98 to reaction tank 86 where it is maintained for about 30 minutes. In each reaction tank, the aqueous medium may be stirred by appropriate stirring means (not shown). The aluminum precipitates in reaction tanks 84 and 86 and is transferred by conduit 102 to clarifier 90 where the precipitated solids build in size and settle to the bottom of the clarifier. The solids are then transferred by suitable conduit and pump 106 to sludge thickening tank 100 and then by conduit and pump 110 to filter press 112 if aluminum hydroxide is to be recovered rather than calcium aluminate. Appropriate means can be used to convert the aluminum hydroxide to sodium aluminate as well known in the art, for example, by the addition of an aqueous base, e.g., sodium hydroxide by conduit 108 into sludge thickening tank 100. Aluminum hydroxide is recovered at conduit 118 from filter press 112. The aqueous medium from filter press 112 can pass by conduit 122 to surge tank 114 where it can be re-used after passing through conduit 116 in reaction tank 84. The supernatant from clarifier 90 passes by conduit 104 to ferrite recovery stage 6.

The reactions which take place in aluminum recovery stage 4 are shown in the following formulas:
Reduction of Iron:

$$4Fe(+++)+S_2O_5(-2)+3H_2O \rightarrow 4\ Fe(++)+2SO_4(-2)+6H(+)$$

Precipitation of Aluminum Hydroxide:

$$Al(+++)+3OH(-)=Al(OH)_3$$

Formation of Aluminate Ions (predominant form is pH dependent):

$$Al(OH)_3+OH(-) \rightarrow Al(OH)_4(-)$$

$$Al(OH)_3+2OH(-) \rightarrow Al(OH)_5(-2)$$

$$Al(OH)_3+3OH(-) \rightarrow Al(OH)_6(-3)$$

Supernatant from clarifier 90 passes to surge tank 124 and by a suitable sump pump and conduit 126 to reaction tank 128 where any soluble ferrous salt, e.g., ferrous sulfate, is added to the supernatant through conduit 132, mixed therewith by suitable means and maintained therein for about 15 minutes. Ferrous sulfate is added in order to provide a stoichiometric level of ferrous ion in an amount sufficient to produce a molar ratio of ferrous ion to non-ferrous metal ion in the supernatant of about 2:1 to about 3:1, preferably a molar ratio of about 2.8:1. The amount of ferrous sulfate added to produce the above molar ratios can be easily determined by one skilled in the art by determining the amount of non-ferrous metal ion in the water and adding a sufficient amount of the ferrous sulfate to maintain the desired molar ratio.

The supernatant passes from reaction tank 128 by conduit 164 to reaction tank 130 where the pH is adjusted to about 9 to about 12, most preferably, about 10.5, by using a suitable base as described above, e.g., sodium hydroxide, added through conduit 134. If acid is required, it can be added to reaction tank 130 by conduit 136. By adjusting the pH to about 9 to about 12, all of the ferrous ion is converted to the hydroxoferrate(II) ion. Any divalent metal ions, e.g., zinc, manganese, magnesium and the like, that have remained in the water after the first two treatment stages will form complexes with the hydroxoferrate(II) ion.

These complexes are illustrated by the layer-by-layer structure of a spinel ferrite complex shown in FIGS. 12(a) to 12(d) where the four layers FIG. 12(a), FIG. 12(b), FIG. 12(c) and FIG. 12(d), that make up a unit cell of lattice parameter a are shown. Successive layers in FIG. 12(a) to FIG. 12(d) are separated by a vertical distance of ¼a. In FIG. 12(a) to FIG. 12(d), oxygen atoms are designated by the numeral 200; metal ions in tetrahedral A site which are at a height ⅛a above each layer are designated by numeral 202; and metal ions in octahedral B site are designated by numeral 204.

The supernatant is held in reaction tank 130 for about 15 minutes and passes from reaction tank 130 by conduit 168 to reaction tank 142. In reaction tank 142, oxidizer 140, e.g., air, is added to the tank by a suitable sparger (not shown) or other means. The air is passed into the supernatant for about 7 minutes to about two hours, more preferably, about 15 to about 25 minutes in a controlled manner to prevent oxidation of the ferrite to the oxide by maintaining the ORP at about −700 mV as shown in FIG. 9. In reaction tank 142, the metal-hydroxoferrate(II) complexes are oxidized by the oxidizer and converted to highly-insoluble metal-hydroxoferrate(III) precipitates also known as spinel ferrite. The ORP measurement is used as a means for monitoring and controlling the reaction. By removing the aluminum in aluminum recovery stage 4, a spinel ferrite material having a high density and high magnetic susceptibility is obtained. The spinel ferrite solids formed in reaction tank 142 pass by conduit 144 to clarifier 146 where the solids build in size and settle to the bottom. The solids are transferred by conduit and pump 148 to sludge thickening tank 150 and then by conduit and pump 156 to filter press 158. The spinel ferrite is recovered at 160, and the aqueous medium from filter press 158 passes by conduit 162 into surge tank 124 for re-use. Clarified water from clarifier 146 passes by a suitable conduit to surge tank 170 where it can be further processed by water softening, reverse-osmosis or can be discharged to the environment.

The reaction mechanism of the ferrite precipitation stage is as follows where formula (3) is the neutralization-precipitation reaction in the presence of ferrous, Fe(+2), ions and wherein in the formula in reaction (4) ferrite is formed by an oxidation reaction where ferrite is simply shown as having incorporated metal, $M_x$, ions:

$$XM(+2)+(3-X)Fe(+2)+6OH(-) \rightarrow M_xFe_{(3-x)}(OH)_6 \quad (3)$$

$$M_xFe_{(3-x)}(OH)_6+½(O_2) \rightarrow M_xFe_{(3-x)}O_4+3H_2O \quad (4)$$

By the process of the present invention, the water leaving the clarifier in the ferrite recovery stage is suitable for secondary uses such as irrigation water. Furthermore, it can be converted to potable water or process water by further processing. In accordance with the present invention, a high grade magnetic spinel ferrite is also recovered wherein the ferrite is suitable for use in the industries that produce transformers, microwaves absorbers, sensors, microprocessors and the like.

It would be apparent to those skilled in the art that various modifications and variations can be made in the process of the present invention without departing from the spirit or scope of the invention. Thus, it is intended that the present invention cover the modifications and variations of this invention provided they come within the scope of the appended claims and their equivalents.

What is claimed is:

1. A process for the treatment of contaminated water and the recovery of spinel ferrite therefrom comprising:

(a) precipitating and recovering from the contaminated water at least a portion of at least one non-ferrous or non-ferric metal precipitate in at least one metal precipitation stage, each metal precipitation stage being carried out at a pre-selected pH at which said metal precipitates from the water, each precipitation and recovery stage comprising:

(i) adding to contaminated water containing iron at least one oxidizing agent to increase the oxidation-reduction potential of the water to a positive potential sufficient to convert iron in the contaminated water, to the ferric ion form wherein iron remains dissolved in the water at said pre-selected pH;

(ii) adding aqueous acid or base or a mixture thereof to contaminated water or to the contaminated water having iron in the form of ferric ion in step (i) to adjust the pH of the water to said pre-selected pH at which precipitation of said at least one metal occurs in the presence of an organic or inorganic sulfur compound;

(iii) adding a sufficient amount of at least one organic or inorganic sulfur compound or mixture thereof, said sulfur compound having a sulfhydryl group or an ionized sulfhydryl group or a sulfur compound which is capable of producing a sulfhydryl group or an ionized sulfhydryl group, to form a precipitate of said at least one metal in the contaminated water at the adjusted pH; and (iv) removing the precipitate of said at least one metal from the water to form an aqueous supernatant free of at least a portion of said at least one non-ferrous or non-ferric metal;

(b) optionally precipitating and recovering aluminum from contaminated water containing aluminum or from aqueous supernatant containing aluminum formed in (a), in a metal precipitation stage wherein the precipitation is carried out at a pH of about 5 at which aluminum precipitates from the water or aqueous supernatant, comprising:

(i) adding to contaminated water containing iron or aqueous supernatant containing iron at least one reducing agent to adjust the oxidation-reduction potential of the water or aqueous supernatant to a less positive or a negative potential sufficient to convert iron in the water or aqueous supernatant to the ferrous ion form wherein iron remains dissolved in the water or aqueous supernatant as a ferrous ion at the pH at which aluminum precipitate is formed;

(ii) adding aqueous acid or base or a mixture thereof to the contaminated water or aqueous supernatant or to the water or aqueous supernatant having the iron in the form of ferrous ion of step (b)(i) to adjust the pH to about 5, thereby causing an aluminum precipitate to form;

(iii) removing the aluminum precipitate from the water or aqueous supernatant to form an aqueous supernatant substantially free of aluminum;

(c) precipitating iron and recovering spinel ferrite from the contaminated water or from the aqueous supernatant formed in (a) or (b) in a precipitation stage wherein the precipitation is carried out at a pH of about 9 to about 12 under controlled oxidation at which spinel ferrite precipitates from the water or aqueous supernatant, comprising:

(i) adding to water containing iron or to an aqueous supernatant containing iron which does not have a less positive or a negative potential sufficient to maintain iron in the ferrous ion form, at least one reducing agent to adjust the oxidation-reduction potential of the water or aqueous supernatant to a less positive or a negative potential sufficient to convert iron in the contaminated water or the aqueous supernatant, to the ferrous ion form;

(ii) adding a stoichiometric amount of water soluble ferrous salt to contaminated water or to an aqueous supernatant derived from contaminated water or to the water or aqueous supernatant of step (c)(i) having a less positive or a negative potential to provide a ferrous ion-containing water having a sufficient amount of ferrous ion to produce metal ferrite from metals dissolved in the ferrous ion-containing water;

(iii) adding an amount of aqueous base to the ferrous ion-containing water sufficient to adjust the pH of the ferrous ion-containing water to about 9 to about 12;

(iv) subjecting the ferrous ion-containing water having a pH of about 9 to about 12 to an oxidizer for a sufficient amount of time to form spinel ferrite precipitate; and (v) removing the spinel ferrite precipitate from the water to form water substantially free of metals.

2. A process for the treatment of contaminated water containing iron, copper, aluminum and other metals and the recovery of copper, aluminum and spinel ferrite therefrom comprising:

(a) precipitating and recovering copper from the contaminated water in a copper precipitation stage, wherein the precipitation is carried out at a pH of about 1 to about 2 at which copper precipitates from the water, comprising:

(i) adding to the contaminated water at least one oxidizing agent in an amount to increase the oxidation-reduction potential of the water to a positive potential sufficient to convert iron to the ferric ion form wherein iron remains dissolved in the water at a pH of about 1 to about 2;

(ii) adding a sufficient amount of aqueous acid or base or a mixture thereof to the contaminated water having iron in the form of ferric ion to adjust the pH of the water to a pH of about 1 to about 2 at which precipitation of copper occurs in the presence of an organic or inorganic sulfur compound;

(iii) adding a sufficient amount of at least one organic or inorganic sulfur compound or mixture thereof, said sulfur compound having a sulfhydryl group or an ionized sulfhydryl group or a sulfur compound which is capable of producing a sulfhydryl group or an ionized sulfhydryl group, to form a copper precipitate in the water at the adjusted pH; and (iv) removing the copper precipitate from the water to form an aqueous supernatant substantially free of said copper; and (v) optionally repeating steps (a)(i) to (a)(iv) to precipitate and recover at least one other metal in at least one metal precipitation stage from the aqueous supernatant of (a)(iv) at a preselected pH at which said one other metal precipitates from the aqueous supernatant to form a precipitated metal and an aqueous supernatant substantially free of said one other metal;

(b) precipitating and recovering aluminum from the contaminated water or from the aqueous supernatant formed in (a)(iv) or (a)(v) in an aluminum precipitation stage wherein the precipitation is carried out at a pH of about 5 at which aluminum precipitates from the water or aqueous supernatant, comprising:

(i) adding to the water or aqueous supernatant at least one reducing agent to adjust the oxidation-reduction potential of the aqueous supernatant to a less positive or a negative potential sufficient to convert iron to the ferrous ion form wherein iron remains dissolved in the aqueous supernatant as a ferrous ion at a pH of about 5 at which aluminum precipitate is formed;

(ii) adding aqueous acid or base or a mixture thereof to the water or aqueous supernatant having the iron in the form of ferrous ion to adjust the pH to about 5, thereby causing an aluminum precipitate to form; and (iii) removing the aluminum precipitate from the water or aqueous supernatant substantially free of copper to form an aqueous supernatant substantially free of copper and aluminum; and (c) precipitating iron and recovering spinel ferrite from the aqueous supernatant formed in (b) in a precipitation stage wherein the precipitation is carried out at a pH of about 9 to about 12 at which spinel ferrite precipitates from the aqueous supernatant comprising:

(i) adding to the aqueous supernatant formed in (b) at least one reducing agent to adjust the oxidation-reduction potential of the aqueous supernatant to a less positive or negative potential sufficient to convert iron in the aqueous supernatant to the ferrous ion form;

(ii) adding a stoichiometric amount of water soluble ferrous salt to the aqueous supernatant formed in (b) to provide a ferrous ion-containing water having a sufficient amount of ferrous ion to produce metal ferrite from the other metals in the ferrous ion-containing water;

(iii) adding an amount of aqueous base to the ferrous ion-containing water sufficient to adjust the pH of the ferrous ion-containing water to about 9 to about 12;

(iv) subjecting the ferrous ion-containing water having a pH of about 9 to about 12 to an oxidizer for a sufficient amount of time to form spinel ferrite precipitate; and (v) removing the spinel ferrite precipitate from the water to form water substantially free of metals.

3. The process according to claim 2, further comprising precipitating and recovering arsenic in precipitation stage (a)(v) from the aqueous supernatant substantially free of copper when the aqueous supernatant contains arsenic, in a metal precipitation stage wherein the precipitation is carried out at a pH of about 1 to about 2 at which arsenic precipitates from the water or aqueous supernatant, comprising:

(i) adding to the aqueous supernatant at least one oxidizing agent to increase the oxidation-reduction potential of the water to a positive potential sufficient to convert iron in the supernatant to the ferric ion form wherein iron remains dissolved in the water at said pH of about 1 to about 2;

(ii) adding aqueous acid or base or a mixture thereof to the supernatant to adjust the pH of the water to about 1 to about 2 at which precipitation of arsenic occurs in the presence of an organic or inorganic sulfur compound;

(iii) adding a sufficient amount of at least one organic or inorganic sulfur compound or mixture thereof, said sulfur compound having a sulfhydryl group or an ionized sulfhydryl group or a sulfur compound which is capable of producing a sulfhydryl group or an ionized sulfhydryl group, to form an arsenic precipitate in the water or supernatant at the adjusted pH; and (iv) removing the arsenic precipitate from the water to form an aqueous supernatant substantially free of copper and arsenic.

4. The process according to claim 2, wherein the oxidizing agent in precipitation stage (a) is added in an amount sufficient to increase the oxidation-reduction potential of the contaminated water to a more positive potential by a least about +50 to about +250 mV.

5. The process according to claim 2, wherein the acid in precipitation stage (a) is sulfuric acid and the pH is adjusted to about 1.5.

6. The process according to claim 2, wherein the organic sulfur compound is sodium ethyl xanthate, potassium ethyl xanthate, calcium ethyl xanthate, sodium glucose xanthate, potassium glucose xanthate, calcium glucose xanthate, sodium isopropyl xanthate, calcium isopropyl xanthate, potassium isopropyl xanthate, calcium dimethyldithiocarbamate, sodium dimethyldithiocarbamate, potassium dimethyldithiocarbamate, sodium diethyldithiocarbamate, calcium diethyldithiocarbamate, potassium diethyldithiocarbamate, cysteine, cystine or glutathione and wherein the inorganic sulfur compound is sodium trithiocarbonate, potassium trithiocarbonate, calcium trithiocarbonate, sodium sulfide, potassium sulfide or calcium sulfide.

7. The process according to claim 6, wherein the organic sulfur compound is sodium dimethyldithiocarbamate.

8. The process according to claim 7, wherein a sufficient amount of sodium dimethyldithiocarbamate is added to the contaminated water to form a copper precipitate at a pH of about 1 to about 2.

9. The process according to claim 2, wherein the reducing agent in precipitation stages (b) or (c) is sodium metabisulfite and is added to the aqueous supernatant in an amount sufficient to reduce the oxidation-reduction potential of the water or the aqueous supernatant.

10. The process according to claim 2, wherein the aqueous base in precipitation stage (b) is aqueous sodium hydroxide and is added in an amount sufficient to adjust the pH to about 5.

11. The process according to claim 2, wherein the water soluble ferrous salt in precipitation stage (c) is ferrous sulfate and a stoichiometric amount of the ferrous ion to non-ferrous metal ion in the aqueous supernatant is about 2:1 to about 3:1.

12. The process according to claim 11, wherein the molar ratio is about 2.8:1.

13. The process according to claim 2, wherein the aqueous base added in the precipitation stage (c) is aqueous sodium hydroxide and is added in an amount sufficient to adjust the pH of the ferrous ion-containing water to a pH of about 9 to about 12.

14. The process according to claim 13, wherein the pH of the ferrous ion-containing water is adjusted to about 10.5.

15. The process according to claim 2, wherein the oxidizer in precipitation stage (c) is oxygen.

16. The process according to claim 15, wherein the oxidizer is the oxygen in air and the air is passed into said aqueous supernatant through a sparger for about 7 minutes to about 2 hours.

17. The process according to claim 2, wherein said spinel ferrite is magnetic spinel ferrite.

18. A process for the treatment of contaminated water which contains non-ferrous and non-ferric main group, transition, lanthanide or actinide metals or mixtures thereof, and optionally iron and aluminum, and the recovery of spinel therefrom by three stages comprising:

(a) precipitating and recovering from the contaminated water at least one non-ferrous or non-ferric metal precipitate in at least one metal precipitation stage, each metal precipitation stage being carried out at a preselected pH at which said metal is precipitated from the water or at a preselected pH at which said metal is precipitated from the water in the presence of an inorganic and/or organic sulfur compound, wherein the sulfur compound has a sulfhydryl group or an ionized sulfhydryl group or a sulfur compound which is capable of producing a sulfhydryl group or an ionized sulfhydryl group, and removing the metal precipitate from the water leaving an aqueous supernatant;

(b) optionally precipitating and recovering aluminum from aluminum-containing contaminated water or from aluminum-containing aqueous supernatant formed in (a), in a metal precipitation stage wherein the precipitation is carried out at a pH of about 4 to about 6 at which pH aluminum is precipitated from the water or aqueous supernatant and is removed from the water or aqueous supernatant to form an aqueous supernatant substantially free of aluminum; and (c) precipitating iron and recovering spinel ferrite from the contaminated water or from the aqueous supernatant formed in precipitation stages (a) or (b) in a precipitation stage wherein the precipitation is carried out at a pH of about 9 to about 12 under controlled oxidation at which spinel ferrite is precipitated from the water or aqueous supernatant to form water substantially free of metals.

19. A process for the treatment of contaminated water or an aqueous supernatant derived from contaminated water and the recovery of spinel ferrite therefrom comprising:
   (a) precipitating and recovering from contaminated water or from an aqueous supernatant derived from contaminated water at least a portion of at least one non-ferrous or non ferric metal precipitate exclusive of aluminum, in at least one metal precipitation stage, each metal precipitation stage being carried out at a pre-selected pH at which said metal precipitates from the water, each precipitation and recovery stage comprising:
      (i) adding to contaminated water containing iron or to an aqueous supernatant derived from contaminated water containing iron at least one oxidizing agent to increase the oxidation-reduction potential of the water to a positive potential sufficient to convert iron in the contaminated water, to the ferric ion form wherein iron remains dissolved in the water at said pre-selected pH;
      (ii) adding aqueous acid or base or a mixture thereof to contaminated water or to an aqueous supernatant derived from contaminated water or to the water or aqueous supernatant having iron in the form of ferric ion of step (i) to adjust the pH of the water to said pre-selected pH at which precipitation of said at least one metal occurs in the presence of an organic or inorganic sulfur compound;
      (iii) adding a sufficient amount of at least one organic or inorganic sulfur compound or mixture thereof, said sulfur compound having a sulfhydryl group or an ionized sulfhydryl group or a sulfur compound which is capable of producing a sulfhydryl group or an ionized sulfhydryl group, to form a precipitate of said at least one metal in the contaminated water or aqueous supernatant at the adjusted pH; and
      (iv) removing the precipitate of said at least one metal from the contaminated water or aqueous supernatant to form an aqueous supernatant derived from contaminated water or aqueous supernatant and free of at least a portion of said at least one metal;
   (b) adding to the aqueous supernatant formed in (a)(iv) at least one reducing agent to adjust the oxidation-reduction potential of the aqueous supernatant to a less positive or a negative potential sufficient to convert iron in the aqueous supernatant, to the ferrous ion form;
   (c) adding a stoichiometric amount of water soluble ferrous salt to the aqueous supernatant of step (b) having a less positive or a negative potential to provide a ferrous ion-containing water having a sufficient amount of ferrous ion to produce metal ferrite from metals dissolved in the ferrous ion-containing water;
   (d) adding an amount of aqueous base to the ferrous ion-containing water sufficient to adjust the pH of the ferrous ion-containing water to about 9 to about 12;
   (e) subjecting the ferrous ion-containing water having a pH of about 9 to about 12 to an oxidizer for a sufficient amount of time to form spinel ferrite precipitate; and
   (f) removing the spinel ferrite precipitate from the water to form water substantially free of metals.

20. A process for the treatment of contaminated water or an aqueous supernatant derived from contaminated water and the recovery of spinel ferrite therefrom comprising:
   (a) precipitating and recovering aluminum from contaminated water containing aluminum or from an aqueous supernatant derived from contaminated water containing aluminum, in a metal precipitation stage wherein the precipitation is carried out at a pH of about 4 to about 6 at which aluminum precipitates from the water or aqueous supernatant, comprising:
      (i) adding to contaminated water containing iron or aqueous supernatant containing iron at least one reducing agent to adjust the oxidation-reduction potential of the water or aqueous supernatant to a less positive or a negative potential sufficient to convert iron in the water or aqueous supernatant to the ferrous ion form wherein iron remains dissolved in the water or aqueous supernatant as a ferrous ion at the pH at which aluminum precipitate is formed;
      (ii) adding aqueous acid or base or a mixture thereof to contaminated water or to aqueous supernatant or to the contaminated water or aqueous supernatant of step (i) having iron in the form of ferrous ion to adjust the pH to about 4 to about 6, thereby causing an aluminum precipitate to form; and
      (iii) removing the aluminum precipitate from the water or aqueous supernatant to form an aqueous supernatant derived from contaminated water and substantially free of aluminum;
   (b) adding to the aqueous supernatant formed in (a)(iii) at least one reducing agent to adjust the oxidation-reduction potential of the aqueous supernatant to a less positive or a negative potential sufficient to convert iron in the aqueous supernatant, to the ferrous ion form;
   (c) adding a stoichiometric amount of water soluble ferrous salt to the aqueous supernatant of step (b) having a less positive or a negative potential to provide a ferrous ion-containing water having a sufficient amount of ferrous ion to produce metal ferrite from metals dissolved in the ferrous ion-containing water;
   (d) adding an amount of aqueous base to the ferrous ion-containing water sufficient to adjust the pH of the ferrous ion-containing water to about 9 to about 12;
   (e) subjecting the ferrous ion-containing water having a pH of about 9 to about 12 to an oxidizer for a sufficient amount of time to form spinel ferrite precipitate; and
   (f) removing the spinel ferrite precipitate from the water to form water substantially free of metals.

21. A process according to claims 1, 19 or 20, wherein the contaminated water contains non-ferrous and non-ferric main group or transition metals and optionally iron.

22. A process according to claim 19, wherein the contaminated water contains iron and non-ferrous, non-ferric main group or transition metals exclusive of aluminum and arsenic, and the spinel ferrite precipitate is a high grade magnetic spinel ferrite.

23. A process according to claims 1, 19 or 20 wherein the process is carried out at ambient temperature.

24. The process according to claims 19 or 1, wherein copper, zinc and lead are present in said contaminated water and a copper precipitate, a zinc precipitate and a lead precipitate are formed in three consecutive metal precipitation stages (a).

25. The process according to claims 19 or 1, wherein copper is present in said contaminated water and a copper precipitate is formed in the water in precipitation stage (a) at a pH of about 1 to about 2.

26. The process according to claims 19 or 1, wherein the oxidizing agent in precipitation stage (a) is added in an amount sufficient to increase the oxidation-reduction potential of the contaminated water to a more positive potential by at least about +50 to about +250 mV.

27. The process according to claims 19 or 1, wherein a sufficient amount of aqueous acid is added to the contaminated water in precipitation stage (a) to adjust the pH to about 1 to about 2.

28. The process according to claim 27, wherein the acid is sulfuric acid and the pH is adjusted to about 1.5.

29. The process according to claims 19 or 1, wherein the organic sulfur compound is sodium ethyl xanthate, potassium ethyl xanthate, calcium ethyl xanthate, sodium glucose xanthate, potassium glucose xanthate, calcium glucose xanthate, sodium isopropyl xanthate, calcium isopropyl xanthate, potassium isopropyl xanthate, calcium dimethyldithiocarbamate, sodium dimethyldithiocarbamate, potassium dimethyldithiocarbamate, sodium diethyldithiocarbamate, calcium diethyldithiocarbamate, potassium diethyldithiocarbamate, cysteine, cystine or glutathione and wherein the inorganic sulfur compound is sodium trithiocarbonate, potassium trithiocarbonate, calcium trithiocarbonate, sodium sulfide, potassium sulfide or calcium sulfide.

30. The process according to claims 19 or 1, wherein the organic sulfur compound is sodium diethyldithiocarbamate.

31. The process according to claims 19 or 1, wherein copper is present in the contaminated water and a sufficient amount of sodium dimethyldithiocarbamate is added to the contaminated water to form a copper precipitate at a pH of about 1 to about 2.

32. The process according to claims 19, 20 or 1, wherein the reducing agent is sodium metabisulfite and is added to the contaminated water or aqueous supernatant in an amount sufficient to reduce the oxidation-reduction potential of the water or the aqueous supernatant.

33. The process according to claim 20 or 1, wherein the aqueous base in precipitation stage (a) of claim 20 and in precipitation stage (b) of claim 4 is aqueous sodium hydroxide and is added in an amount sufficient to adjust the pH to about 5.

34. The process according to claims 19 or 1, wherein the water soluble ferrous salt is ferrous sulfate and a stoichiometric amount of the ferrous sulfate is an amount sufficient to produce a molar ratio of ferrous ion to non-ferrous metal ion in the water or aqueous supernatant of about 2:1 to about 3:1.

35. The process according to claim 33, wherein molar ratio is about 2.8:1.

36. The process according to claim 19, wherein the aqueous base is aqueous sodium hydroxide and is added in an amount sufficient to adjust the pH of the ferrous ion-containing water to a pH of about 9 to about 12.

37. The process according to claim 1, wherein the aqueous base added in the precipitation stage (c) is aqueous sodium hydroxide and is added in an amount sufficient to adjust the pH of the ferrous ion-containing water to a pH of about 9 to about 12.

38. The process according to claims 36 or 37, wherein the pH of the ferrous ion-containing water is adjusted to about 10.5.

39. The process according to claims 19 or 1, wherein the oxidizer is oxygen.

40. The process according to claims 19 or 1, wherein the oxidizer is the oxygen in air and the air is passed into said water or aqueous supernatant for about 7 minutes to about 2 hours.

41. The process according to claims 19 or 1, wherein the air is passed into said water or aqueous supernatant by a sparger, thereby reducing oxidation time.

42. The process according to claims 19 or 1, further comprising precipitating and recovering arsenic from the contaminated water containing arsenic or from an aqueous supernatant containing arsenic, in a metal precipitation stage wherein the precipitation is carried out at a pH of about 1 to about 2 at which arsenic precipitates from the water or aqueous supernatant, comprising:

(i) adding to contaminated water containing iron or aqueous supernatant containing iron at least one oxidizing agent to increase the oxidation-reduction potential of the water to a positive potential sufficient to convert iron in the water or supernatant to the ferric ion form wherein iron remains dissolved in the water at said pre-selected pH;

(ii) adding aqueous acid or base or a mixture thereof to water or supernatant having iron in the form of ferric ion to adjust the pH of the water to about 1 to about 2 at which precipitation of arsenic occurs in the presence of an organic or inorganic sulfur compound;

(iii) adding a sufficient amount of at least one organic or inorganic sulfur compound or mixture thereof, said sulfur compound having a sulfhydryl group or an ionized sulfhydryl group or a sulfur compound which is capable of producing a sulfhydryl group or an ionized sulfhydryl group, to form an arsenic precipitate in the water or supernatant at the adjusted pH; and (iv) removing the arsenic precipitate from the water to form an aqueous supernatant substantially free of arsenic.

\* \* \* \* \*

UNITED STATES PATENT AND TRADEMARK OFFICE
CERTIFICATE OF CORRECTION

PATENT NO. : 5,505,857

DATED : April 9, 1996

INVENTOR(S) : Manoranjan MISRA, Mark E. KRAVETZ, Kang YANG, and Thomas E. McNEEL It is certified that error appears in the above-identified patent and that said Letters Patent is hereby corrected as shown below:

Claim 33, column 27, line 37, "Claim 4" should read --Claim 1--.

The title page, at column 1, line 5 (under "Inventors"), and after "Kravetz", "Cote Madera, Calif." should read --Corte Madera, Calif.--.

Signed and Sealed this

Thirteenth Day of August, 1996

Attest:

BRUCE LEHMAN

Attesting Officer

Commissioner of Patents and Trademarks